United States Patent
Hiramoto et al.

(10) Patent No.: US 6,798,620 B2
(45) Date of Patent: Sep. 28, 2004

(54) MAGNETO-RESISTIVE ELEMENT, MAGNETIC HEAD, AND MAGNETIC RECORDING AND REPRODUCTION APPARATUS

(75) Inventors: Masayoshi Hiramoto, Nara (JP); Nozomu Matsukawa, Nara (JP); Akihiro Odagawa, Nara (JP); Hideaki Adachi, Osaka (JP); Kenji Iijima, Kyoto (JP); Hiroshi Sakakima, Kyoto (JP); Yasunari Sugita, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/441,794

(22) Filed: May 20, 2003

(65) Prior Publication Data

US 2003/0193758 A1 Oct. 16, 2003

Related U.S. Application Data

(62) Division of application No. 10/007,454, filed on Nov. 8, 2001, now abandoned.

(30) Foreign Application Priority Data

Nov. 15, 2000 (JP) ........................................ 2000-348862

(51) Int. Cl.$^7$ .............................................. G11B 5/127
(52) U.S. Cl. ...................................................... 360/321
(58) Field of Search ............................. 360/321, 324.2, 360/324.11, 324.12, 322, 319, 327.32, 126, 121, 122, 125

(56) References Cited

U.S. PATENT DOCUMENTS

| | | |
|---|---|---|
| 5,493,467 A | 2/1996 | Cain et al. .................. 360/321 |
| 5,594,608 A | 1/1997 | Dee .......................... 360/126 |
| 5,634,259 A | 6/1997 | Sone et al. .............. 29/603.12 |
| 5,753,092 A | 5/1998 | Hollars et al. .............. 118/719 |
| 5,867,350 A | 2/1999 | Haga et al. ................. 360/128 |
| 6,038,093 A | 3/2000 | Takada et al. ................. 360/66 |
| 6,038,106 A | 3/2000 | Aboaf et al. ................. 360/317 |
| 6,052,263 A | 4/2000 | Gill ............................ 324/252 |
| 6,084,405 A | 7/2000 | Suzuki ....................... 324/252 |
| 6,114,056 A | 9/2000 | Inomata et al. .......... 360/324.2 |

(List continued on next page.)

FOREIGN PATENT DOCUMENTS

JP  2001-331913  11/2001

OTHER PUBLICATIONS

English translation of the publication IDEMA Japan News No. 39.

(List continued on next page.)

Primary Examiner—Allen Cao
(74) Attorney, Agent, or Firm—Renner, Otto, Boisselle & Sklar, LLP

(57) ABSTRACT

A magnetic head including a magnetic substrate for operating as a first electrode, a multi-layer film formed on a portion of the surface of the magnetic substrate an inter-layer insulating layer provided to cover side surfaces of the multi-layer film, a flux guide formed on surfaces of the multi-layer film and inter-layer insulating layers, a non-magnetic conductive layer formed on a surface of the flux guide, and a second electrode formed on a surface of the non-magnetic conductive layer, in which the multi-layer film includes a first magnetic layer formed on a portion of the surface of the magnetic substrate and includes a fixed layer, and a second magnetic layer including a non-magnetic layer formed on a surface of the first magnetic layer and a free layer formed on a surface of the non-magnetic layer.

20 Claims, 17 Drawing Sheets

U.S. PATENT DOCUMENTS

| | | | |
|---|---|---|---|
| 6,165,607 A | 12/2000 | Yamanobe et al. | 148/314 |
| 6,219,213 B1 | 4/2001 | Goto et al. | 360/79 |
| 6,275,363 B1 | 8/2001 | Gill | 360/324.2 |
| 6,313,973 B1 | 11/2001 | Fuke et al. | 360/324.1 |
| 6,381,106 B1 | 4/2002 | Pinarbasi | 360/324.12 |
| 6,486,662 B1 | 11/2002 | Ruigrok et al. | 324/252 |

OTHER PUBLICATIONS

IDEMA Japan News No. 39, pp. 3–6.

Coehoorn et al.; "The Electrical and Magnetic . . . Tunnel Junction"; IEEE Transactions on Magnetics; vol. 35, No. 5, Sep. 1999.

Japanese Office Action Dated Apr. 6, 2004.

MAGNETO-RESISTIVE ELEMENT, MAGNETIC HEAD, AND MAGNETIC RECORDING AND REPRODUCTION APPARATUS

CROSS-REFERENCE TO RELATED APPLICATIONS

The present application is a divisional of, and claims priority under 35 U.S.C. §120 U.S. application Ser. No. 10/007,454, filed Nov. 8, 2001, now abandoned.

BACKGROUND OF THE INVENTION

1. Field of the Invention

The present invention relates to a magneto-resistive element, a magnetic head, and a magnetic recording and reproduction apparatus used for magnetic recording or magneto-optic recording, and more specifically to a magneto-resistive element, a magnetic head, and a magnetic recording and reproduction apparatus using a magnetic substrate.

2. Description of the Related Art

Recently, an increase in image information used for digital broadcasting or the like requires a further improvement in the magnetic recording density. Specifically in the field of magnetic heads for use with a magnetic tape, an MIG (metal in gap) head, using a metal magnetic film having a high saturation magnetic flux density in the vicinity of the magnetic gap, is being used more and more widely.

The transfer rate for information recording is now required to be almost 100 MHz. Inductive magnetic heads including an MIG head have a problem that the reproduction capability is significantly reduced as the frequency is increased, due to the loss of eddy current and the limit of ferromagnetic resonance.

In order to overcome this problem, a yoke-type thin film magnetic head using a GMR (gigantic magneto-resistive) element is now under study. The yoke-type thin film magnetic head includes a yoke formed of a high saturation magnetic flux density material and thus has an advantage of a smaller loss at a high frequency.

However, a magnetic head using a thin film magnetic material has a problem of a significantly poor anti-abrasion characteristic when used for a tape medium. The poor anti-abrasion characteristic affects the life of the head.

A head including a yoke formed of a high saturation magnetic flux density material and including a GMR element as a magneto-resistive element has the following problem. A free layer of the GMR element located in a gap in the yoke has a thickness of several nanometers, and thus magnetic saturation is likely to occur. Therefore, a magnetic circuit formed of the yoke has a larger magnetic resistance, and as a result, the efficiency of the head is reduced.

SUMMARY OF THE INVENTION

According to one aspect of the invention, a magneto-resistive element includes a magnetic substrate; a magnetic layer; and a non-magnetic layer provided between the magnetic substrate and the magnetic layer.

In one embodiment of the invention, a relative angle between a magnetization direction of the magnetic substrate and a magnetization direction of the magnetic layer changes in accordance with a change in an external magnetic field.

In one embodiment of the invention, the magnetic substrate includes a free layer in which magnetization rotation with respect to an external magnetic field is possible. The magnetic layer includes a fixed layer in which magnetization rotation with respect to the external magnetic field is more difficult to occur than in the free layer.

In one embodiment of the invention, the magneto-resistive element further includes a hard magnetic layer with a large coercive force provided so as to face the magnetic substrate with the magnetic layer interposed therebetween.

In one embodiment of the invention, the magneto-resistive element further includes an anti-ferromagnetic layer provided so as to face the magnetic substrate with the magnetic layer interposed therebetween.

In one embodiment of the invention, the magneto-resistive element further includes a synthetic anti-ferromagnetic layer provided so as to face the magnetic substrate with the magnetic layer interposed therebetween, the synthetic anti-ferromagnetic layer being magnetically coupled with the anti-ferromagnetic layer.

In one embodiment of the invention, the magneto-resistive element further includes a soft magnetic layer with a high saturation magnetic flux density provided between the magnetic substrate and the non-magnetic layer.

In one embodiment of the invention, the magneto-resistive element further includes an anti-ferromagnetic layer provided between the magnetic substrate and the non-magnetic layer.

In one embodiment of the invention, the magnetic substrate contains ferrite.

In one embodiment of the invention, the magnetic substrate contains an oxide.

In one embodiment of the invention, the magnetic substrate contains a single crystalline oxide.

In one embodiment of the invention, the magnetic layer contains magnetite.

In one embodiment of the invention, the magnetic layer contains at least one element selected from the group consisting of O, N, P, C and B.

In one embodiment of the invention, the non-magnetic layer includes a tunnel layer.

In one embodiment of the invention, the non-magnetic layer includes a metal non-magnetic layer.

According to another aspect of the invention, a magneto-resistive element includes a magnetic substrate; a first magnetic layer; a second magnetic layer provided so as to face the magnetic substrate with the first magnetic layer interposed therebetween; and a first non-magnetic layer provided between the first magnetic layer and the second magnetic layer.

In one embodiment of the invention, a relative angle between a magnetization direction of the first magnetic layer and a magnetization direction of the second magnetic layer changes in accordance with a change in an external magnetic field.

In one embodiment of the invention, the magnetic substrate and the first magnetic layer are magnetically coupled with each other.

In one embodiment of the invention, the magnetic substrate and the first magnetic layer are coupled with each other by ferromagnetic coupling by which a magnetization direction of the magnetic substrate and a magnetization direction of the first magnetic layer are parallel to each other.

In one embodiment of the invention, the magnetic substrate and the first magnetic layer are coupled with each other by ferromagnetic coupling by which a magnetization direction of the magnetic substrate and a magnetization direction of the first magnetic layer are anti-parallel to each other.

In one embodiment of the invention, the magnetic substrate and the first magnetic layer are coupled with each other by static magnetic coupling.

In one embodiment of the invention, the magneto-resistive element further includes an underlying layer provided between the magnetic substrate and the first magnetic layer.

In one embodiment of the invention, the underlying layer includes a second non-magnetic layer.

In one embodiment of the invention, the underlying layer includes an anti-ferromagnetic layer.

In one embodiment of the invention, the underlying layer has a thickness in the range of 0.5 nm to 50 nm including 0.5 nm and 50 nm.

In one embodiment of the invention, the first magnetic layer includes a free layer in which magnetization rotation with respect to an external magnetic field is possible. The second magnetic layer includes a fixed layer in which magnetization rotation with respect to the external magnetic field is more difficult to occur than in the free layer.

In one embodiment of the invention, the magneto-resistive element further includes a hard magnetic layer with a large coercive force provided so as to face the magnetic substrate with the second magnetic layer interposed therebetween.

In one embodiment of the invention, the magneto-resistive element further includes an anti-ferromagnetic layer provided so as to face the magnetic substrate with the second magnetic layer interposed therebetween.

In one embodiment of the invention, the magneto-resistive element further includes a synthetic anti-ferromagnetic layer provided so as to face the magnetic substrate with the second magnetic layer interposed therebetween, the synthetic anti-ferromagnetic layer being magnetically coupled with the anti-ferromagnetic layer.

In one embodiment of the invention, the magneto-resistive element further includes a soft magnetic layer with a high saturation magnetic flux density provided between the magnetic substrate and the first magnetic layer.

In one embodiment of the invention, the magnetic substrate contains ferrite.

In one embodiment of the invention, the magnetic substrate contains an oxide.

In one embodiment of the invention, the magnetic substrate contains a single crystalline oxide.

In one embodiment of the invention, the first magnetic layer contains magnetite.

In one embodiment of the invention, the first magnetic layer contains at least one element selected from the group consisting of O, N, P, C and B.

In one embodiment of the invention, the first non-magnetic layer includes a tunnel layer.

In one embodiment of the invention, the first non-magnetic layer includes a metal non-magnetic layer.

In one embodiment of the invention, the magneto-resistive element further includes a flux guide provided so as to face the magnetic substrate with the second magnetic layer interposed therebetween.

In one embodiment of the invention, the magneto-resistive element further includes a non-magnetic conductive layer provided so as to face the magnetic substrate with the flux guide interposed therebetween.

In one embodiment of the invention, the first magnetic layer includes a magnetic layer with a high spin polarization.

In one embodiment of the invention, the first magnetic layer further includes a non-magnetic layer for anti-ferromagnetic exchange coupling.

In one embodiment of the invention, the first magnetic layer further includes a magnetic layer for anti-ferromagnetic exchange coupling provided so as to face the magnetic layer with a high spin polarization with the non-magnetic layer for anti-ferromagnetic exchange coupling interposed therebetween.

In one embodiment of the invention, the first magnetic layer further includes an anti-ferromagnetic layer provided so as to face the non-magnetic layer for anti-ferromagnetic exchange coupling with the magnetic layer for anti-ferromagnetic exchange coupling interposed therebetween.

According to still another aspect of the invention, a magnetic head includes a magneto-resistive element including a magnetic substrate, a magnetic layer, and a non-magnetic layer provided between the magnetic substrate and the magnetic layer; and also includes a yoke. The yoke has a magnetic gap formed of a non-magnetic material. The magnetic substrate acts as a portion of the yoke.

In one embodiment of the invention, the yoke includes a magnetic member having a saturation magnetic flux density higher than a saturation magnetic flux density of the magnetic substrate at least in the vicinity of the magnetic gap, the magnetic head further comprising an electromagnetic coil wound around the yoke.

According to still another aspect of the invention, a magnetic head includes a magneto-resistive element including a magnetic substrate, a first magnetic layer, a second magnetic layer provided so as to face the magnetic substrate with the first magnetic layer interposed therebetween, and a first non-magnetic layer provided between the first magnetic layer and the second magnetic layer; and also includes a yoke. The yoke has a magnetic gap formed of a non-magnetic material. The magnetic substrate acts as a portion of the yoke.

In one embodiment of the invention, the yoke includes a magnetic member having a saturation magnetic flux density higher than a saturation magnetic flux density of the magnetic substrate at least in the vicinity of the magnetic gap, the magnetic head further comprising an electromagnetic coil wound around the yoke.

According to still another aspect of the invention, a magnetic recording and reproduction apparatus includes one of the above-described magnetic head for reproducing data from a recording medium so as to generate a signal and for recording data represented by a signal on the recording medium; an arm for mounting the magnetic head; a driving section for driving the arm; and a signal processing section for processing the signal. The recording medium is surface-treated with a DLC film.

In one embodiment of the invention, the yoke has a surface facing the recording medium, and the surface is surface-treated with a DLC film.

According to still another aspect of the invention, a magnetic recording and reproduction apparatus includes any of the above-described magnetic heads; a rotatable drum for mounting the magnetic head on an external circumferential surface thereof; and a tape guiding mechanism for guiding the magnetic tape to the rotatable drum so as to place the magnetic tape into contact with the external circumferential surface. The magnetic head records data on and reproduce data from the magnetic tape.

In one embodiment of the invention, the yoke has a surface facing the magnetic tape, and the surface is surface-treated with a DLC film.

The present invention provides the following effects.

A magneto-resistive element utilizing the soft magnetic characteristics of the magnetic substrate is provided.

In the case where the magnetic substrate contains, for example, an oxide, magnetite is unlikely to diffused to, for example, the magnetic substrate.

In the case where the magnetic substrate contains, for example, a single crystalline oxide, epitaxial growth of the layers is realized.

In the case where the magnetic layer contains at least one element selected from the group consisting of O, N, P, C and B, especially when the magnetic substrate contains an oxide, reaction deteriorating magnetic characteristics, for example, interdiffusion, are suppressed.

In the case where the magneto-resistive element includes a non-magnetic layer having a tunnel layer and thus utilizes a tunneling magnetic effect, even when the magnetic substrate is conductive, the MR (magnetic resistance) is not lowered by the shunt effect, unlike the conventional GMR element. A tunneling magnetic effect element utilizing the magnetic characteristics of the magnetic substrate can be provided.

In the case where the magneto-resistive element includes a non-magnetic layer including a metal non-magnetic layer and thus utilizes a GMR effect, and further when, for example, the magnetic substrate is highly resistive, the MR is not lowered by the shunt effect. A GMR element utilizing the magnetic characteristics of the magnetic substrate can be provided.

Since the yoke includes a magnetic substrate having superb magnetic characteristics, the magnetic head has superior anti-abrasion characteristics which is inherent in the magnetic substrate.

Since the soft magnetic layer with a high saturation magnetic flux density is provided in the vicinity of the magnetic gap of the yoke (recording gap), data can be recorded on a magnetic recording medium in a magnetic field for recording generated by the magnetic coil. In addition, the magnetic head has excellent anti-abrasion characteristics due to a magneto-resistive element having satisfactory reproduction characteristics.

In a magnetic recording and reproduction apparatus according to the present invention, the DLC film for increasing the resistance of the magnetic head so as to prevent the leak current from flowing to the magnetic recording and reproduction apparatus, specifically, the magnetic head. Therefore, reduction in the magneto-resistive effect caused by the leak current is suppressed.

Thus, the invention described herein makes possible the advantages of providing a magneto-resistive element, a magnetic head, and a magnetic recording and reproduction apparatus having a satisfactory anti-abrasion characteristic and a sufficiently high head efficiency.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

Figure 1:
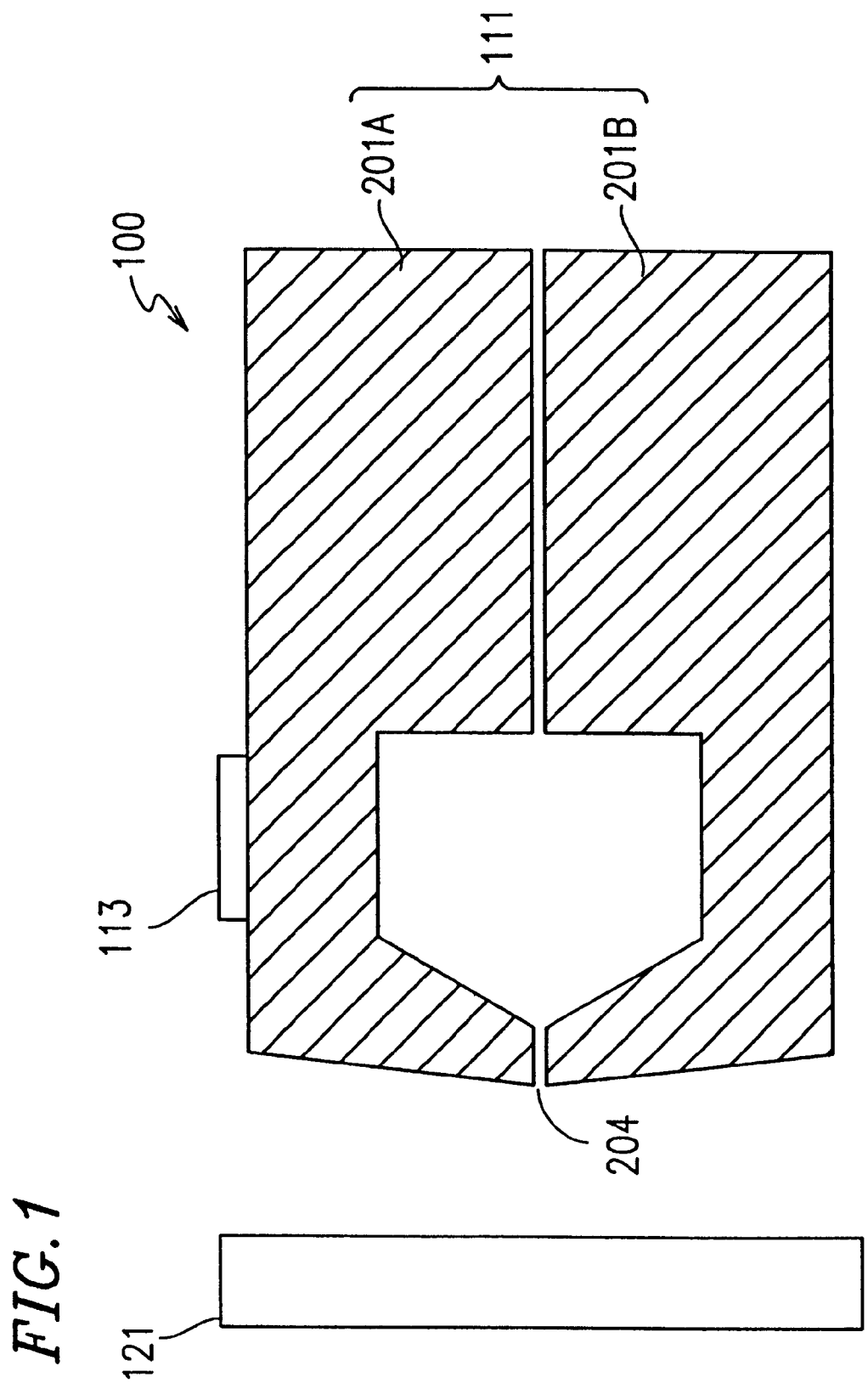
FIG. 1 shows a structure of a magnetic head according to one example of the present invention.

FIG. 1 shows a structure of a magnetic head 100 according to a first example of the present invention. The magnetic head 100 includes a yoke 111. The yoke 111 includes a pair of magnetic substrates 201A and 201B, which are generally C-shaped with a recess. The magnetic substrates 201A and 201B are located so that the recesses face each other. The magnetic substrates 201A and 201B are formed of ferrite, and may contain at least one of an oxide and a single crystalline oxide. The yoke 111 has a gap 204 formed of a non-magnetic material between the magnetic substrates 201A and 201B at one end thereof. The magnetic head 100 includes a multi-layer film 113 provided on a portion of a surface of the magnetic substrate 201A opposite to the magnetic substrate 201B.

In FIG. 1, reference numeral 121 represents a magnetic recording medium.

Figure 2:
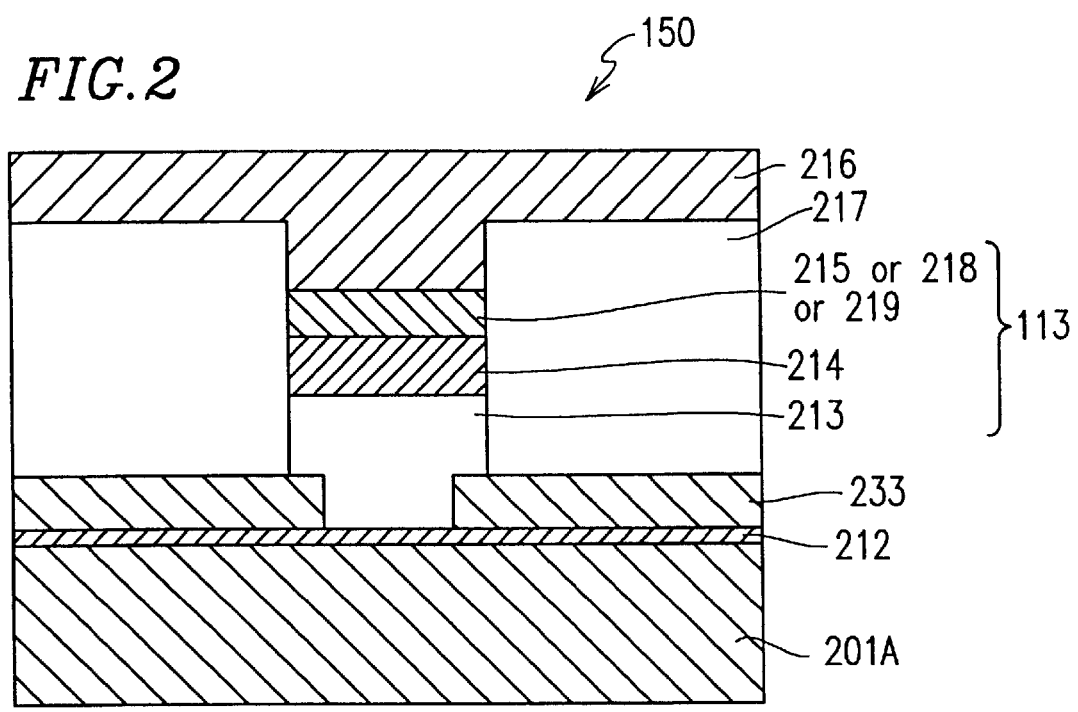
FIG. 2 is a cross-sectional view of a magneto-resistive element included in the magnetic head shown in FIG. 1.

FIG. 2 is a cross-sectional view of a magneto-resistive element 150. The magneto-resistive element 150 includes the magnetic substrate 201A, a soft magnetic layer with a high saturation magnetic flux density 212, anti-ferromagnetic layers 233, the multi-layer film 113, interlayer insulating layers 217 and an electrode 216. The magnetic substrate 201A also acts as a portion of the yoke 111.

The soft magnetic layer with a high saturation magnetic flux density 212 and the anti-ferromagnetic layers 233 are laminated between the surface of the magnetic substrate 201A and the multi-layer film 113 although not shown in FIG. 1. The soft magnetic layer with a high saturation magnetic flux density 212 is provided on the surface of the magnetic substrate 201A, and the anti-ferromagnetic layers 233 are provided on portions of a surface of the soft magnetic layer with a high saturation magnetic flux density 212 so as to expose a portion of the soft magnetic layer with a high saturation magnetic flux density 212. The soft magnetic layer with a high saturation magnetic flux density 212 has a saturation magnetic flux density of 1.0 T (Tesla) or higher. The magnetic substrate 201A includes a free layer (not shown) in which magnetization rotation can easily be performed with respect to an external magnetic field.

The non-magnetic layer 213 is provided so as to cover a portion of each anti-ferromagnetic layer 233 and the portion of the soft magnetic layer with a high saturation magnetic flux density 212 which is exposed by the anti-ferromagnetic layers 233. The non-magnetic layer 213 includes a tunneling layer. The non-magnetic layer 213 may include a metal non-magnetic material.

The non-magnetic layer 213 is topped by a magnetic layer 214 and an anti-ferromagnetic layer 215 provided in this order. In the magnetic layer 214, magnetization rotation with respect to the external magnetic field is more difficult to occur than in the free layer, due to the exchange bias from the anti-ferromagnetic layer 215. In other words, the magnetic layer 214 includes a fixed layer. The magnetic layer 214 may include magnetite, or may be formed of at least one element selected from the group consisting of O, N, P, C and B. The multi-layer film 113 includes the non-magnetic layer 213, the magnetic layer 214, and the anti-ferromagnetic layer 215.

Portions of the anti-ferromagnetic layers 233 which are not covered with the non-magnetic layer 213 are topped by inter-layer insulating layers 217, which are provided so as to cover side surfaces of the multi-layer film 113. The multi-layer film 113 is buried between the inter-layer insulating layers 217.

Surfaces of the inter-layer insulating layers 217 and a surface of the multi-layer film 113 are substantially entirely covered with the electrode 216. The multi-layer film 113 is in contact with the electrode 216. Due to the electrode 216 provided in this manner, a current flows vertically to surfaces of the layers in the multi-layer film 113. When the non-magnetic layer 214 includes a tunneling element, the magneto-resistive element 150 acts as a TMR (tunnel magneto-resistive) element. When the non-magnetic layer 214 includes a metal non-magnetic material, the magneto-resistive element 150 acts as a vertical current-type GMR element.

The anti-ferromagnetic layer 215 may be replaced with a hard magnetic layer with a large coercive force 219 having a large magnetic anisotropy formed of, for example, a CoPt alloy, a CoPtCr alloy, or an FePt alloy. The hard magnetic layer with a large coercive force 219 has a magnetic force of, for example, 100 Oe (oersted) or higher. Alternatively, the anti-ferromagnetic layer 215 may be replaced with a synthetic anti-ferromagnetic layer 218. The synthetic anti-ferromagnetic layer 218 includes two magnetic layers and a non-magnetic layer interposed between the two magnetic layers. In the synthetic anti-ferromagnetic layer 218, the magnetization direction of the two magnetic layers are stably anti-parallel due to an anti-ferromagnetic exchange coupling through the non-magnetic layer interposed therebetween. The synthetic anti-ferromagnetic layer 218 may be provided between the anti-ferromagnetic layer 215 and the magnetic layer 214.

The magneto-resistive element 150 having the above-described structure operates, for example, as follows with reference to FIGS. 1 and 2.

An external magnetic field generated from the magnetic recording medium 121 passes through the magnetic gap 204 and reaches the magnetic substrate 201A. The magnetic substrate 201A includes a free layer in which magnetization rotation with respect to the external magnetic field is possible. Therefore, the magnetization direction of the magnetic substrate 201A changes in accordance with a change in the external magnetic field. The magnetic layer 214 includes a fixed layer in which magnetization rotation with respect to the external magnetic field is more difficult to occur than in the free layer. Therefore, even when the external magnetic field is changed, the magnetization rotation of the magnetic layer 214 does not change. Accordingly, the relative angle between the magnetization direction of the magnetic substrate 201A and the magnetization direction of the magnetic layer 214 changes; and in accordance with the change in the relative angle, the magnetic resistance of the magneto-resistive element 150 changes.

When a current is caused to flow between the electrode 216 and the magnetic substrate 201A acting as a lower electrode in a direction vertical to the surfaces of the layers of the multi-layer film 113, a change in the voltage which is in accordance with the change in the relative angle is detected. When a voltage is applied between the electrode 216 and the magnetic substrate 201A in a direction vertical to the surfaces of the layers of the multi-layer film 113, a change in the current which is in accordance with the change in the relative angle is detected.

EXAMPLE 2

Figure 3:
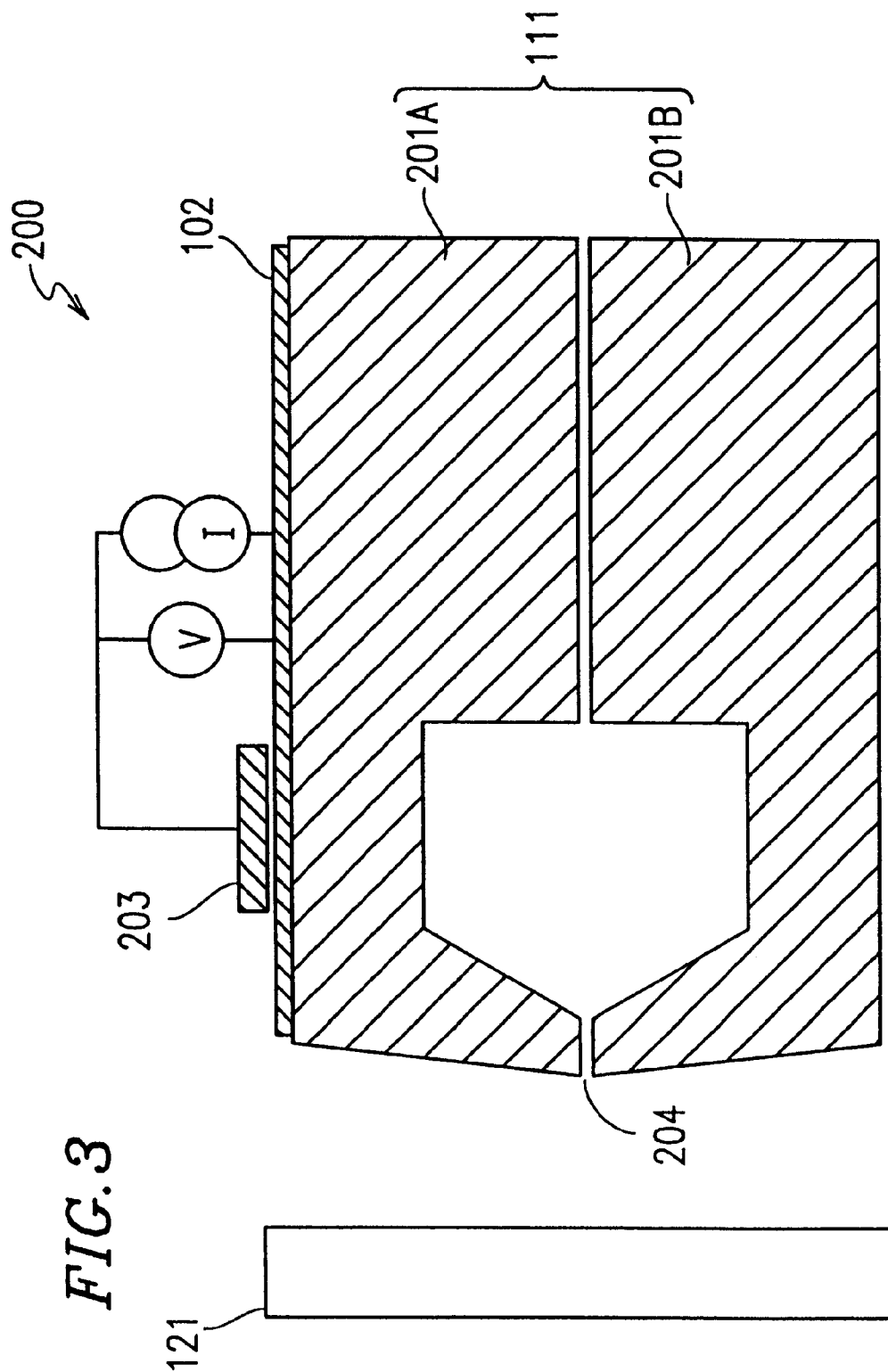
FIG. 3 shows a structure of a magnetic head according to another example of the present invention.

FIG. 3 shows a structure of a magnetic head 200 according to a second example of the present invention. Identical elements previously discussed with respect to FIGS. 1 and 2 bear identical reference numerals and the detailed descriptions thereof will be omitted.

The magnetic head 200 includes a yoke 111. The yoke 111 includes a pair of magnetic substrates 201A and 201B. The magnetic substrates 201A and 201B are generally C-shaped with a recess. The magnetic substrates 201A and 201B are located so that the recesses face each other. The magnetic substrates 201A and 201B are formed of ferrite. The magnetic substrates 201A and 201B may contain at least one of an oxide and a single crystalline oxide. The yoke 111 has a gap 204 formed of a non-magnetic material between the magnetic substrates 201A and 201B at one end thereof. The magnetic head 200 further includes a magnetic layer 102 provided on a surface of the magnetic substrate 201A opposite to the magnetic substrate 201B, and a multi-layer film 203 provided on a portion of a surface of the magnetic layer 102 opposite to the magnetic substrate 201A.

Figure 4:
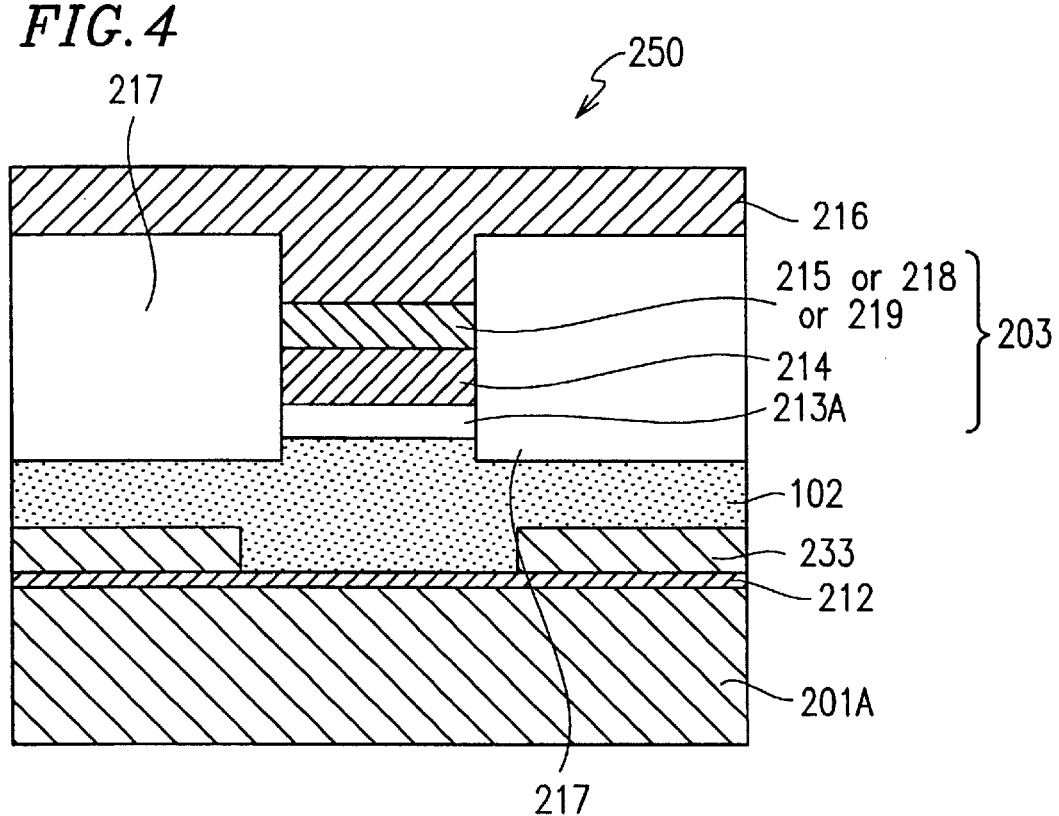
FIG. 4 is a cross-sectional view of a magneto-resistive element included in the magnetic head shown in FIG. 3.

FIG. 4 is a cross-sectional view of a magneto-resistive element 250. The magneto-resistive element 250 includes the magnetic substrate 201A, a soft magnetic layer with a high saturation magnetic flux density 212, anti-ferromagnetic layers 233, the magnetic layer 102, the multi-layer film 203, interlayer insulating layers 217 and an electrode 216. The magnetic substrate 201A also acts as a portion of the yoke 111.

The soft magnetic layer with a high saturation magnetic flux density 212, and the anti-ferromagnetic layers 233 are laminated between the surface of the magnetic substrate 201A and the magnetic layer 102 although not shown in FIG. 3. The soft magnetic layer with a high saturation magnetic flux density 212 is provided on a surface of the magnetic substrate 201A, and the anti-ferromagnetic layers 233 are provided on portions of a surface of the soft magnetic layer with a high saturation magnetic flux density 212 so as to expose a portion of the soft magnetic layer with a high saturation magnetic flux density 212.

The magnetic layer 102 is provided so as to cover the anti-ferromagnetic layers 233 and the portion of the soft magnetic layer with a high saturation magnetic flux density 212 which is exposed by the anti-ferromagnetic layers 233. The magnetic layer 102 includes a free layer in which magnetization rotation with respect to the external magnetic field is possible. The magnetic layer 102 and the magnetic substrate 201A are magnetically coupled to each other by a ferromagnetic coupling by which the magnetization directions thereof are parallel to each other. Alternatively, the magnetic layer 102 and the magnetic substrate 201A may be coupled to each other by an anti-ferromagnetic coupling by which the magnetization directions thereof are anti-parallel to each other, or may be coupled to each other by a static magnetic coupling.

A non-magnetic layer 213A is provided on a portion of a surface of the magnetic layer 102. The non-magnetic layer 213A is topped by a magnetic layer 214 and an anti-ferromagnetic layer 215 provided in this order. In the magnetic layer 214, magnetization rotation with respect to the external magnetic field is more difficult to occur than in the free layer, due to the exchange bias from the anti-ferromagnetic layer 215. In other words, the magnetic layer 214 includes a fixed layer. The magnetic layer 214 may contain magnetite, or may be formed of at least one element selected from the group consisting of O, N, P, C and B. The multi-layer film 203 includes the non-magnetic layer 213A, the magnetic layer 214, and the anti-ferromagnetic layer 215.

By forming the electrode 216 on the multi-layer film 203 as shown in FIG. 4 and as described below, a current flows in a direction vertical to surfaces of layers of the multi-layer film 203.

The anti-ferromagnetic layer 215 may be replaced with a hard magnetic layer with a large coercive force 219 having a large magnetic anisotropy formed of, for example, a CoPt alloy, a CoPtCr alloy, or an FePt alloy. The hard magnetic layer with a large coercive force 219 has a magnetic force of, for example, 100 Oe (oersted) or higher. Alternatively, the anti-ferromagnetic layer 215 may be replaced with a synthetic anti-ferromagnetic layer 218. The synthetic anti-ferromagnetic layer 218 includes two magnetic layers and a non-magnetic layer interposed between the two magnetic layers. In the synthetic anti-ferromagnetic layer 218, the magnetization direction of the two magnetic layers are stably anti-parallel due to an anti-ferromagnetic exchange coupling through the non-magnetic layer interposed therebetween. The synthetic anti-ferromagnetic layer 218 may be provided between the anti-ferromagnetic layer 215 and the magnetic layer 214.

Portions of the magnetic layer 102 which are not covered with the non-magnetic layer 213A are topped by inter-layer insulating layers 217, which are provided so as to cover side surfaces of the multi-layer film 203. The multi-layer film 203 is buried between the inter-layer insulating layers 217.

Surface of the inter-layer insulating layers 217 and a surface of the multi-layer film 203 are substantially entirely covered with the electrode 216. The multi-layer film 203 is in contact with the electrode 216. Due to the electrode 216 provided in this manner, a current flows vertically to surfaces of the layers in the multi-layer film 203.

In the second example, the multi-layer film 203 includes a tunneling element. Alternatively, a multi-layer film acting as a part of a GMR element may be used in magnetic heads shown in each of FIGS. 1, 3, 7 and 9.

EXAMPLE 3

Figure 5:
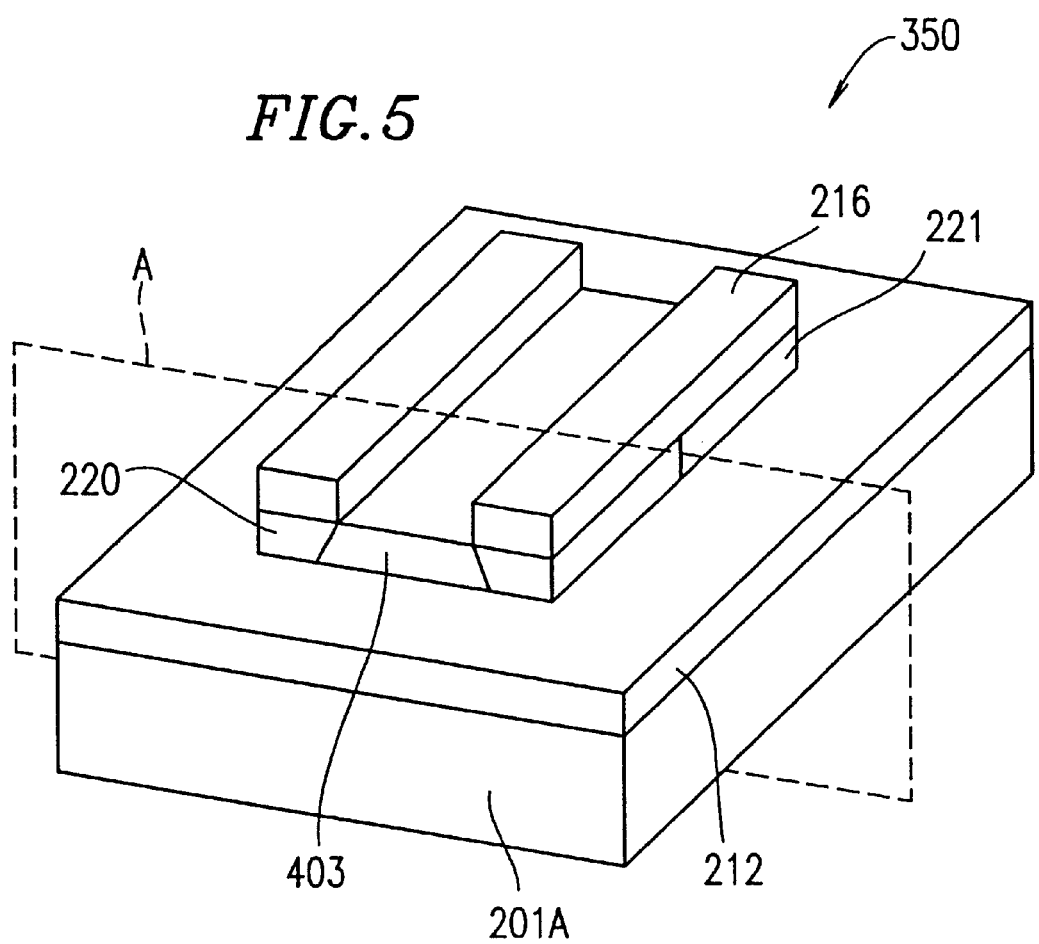
FIG. 5 is an isometric view of a magneto-resistive element according to still another example of the present invention.

FIG. 5 is an isometric view of a magneto-resistive element 350 according to a third example of the present invention. Identical elements previously discussed with respect to FIGS. 3 and 4 bear identical reference numerals and the detailed descriptions thereof will be omitted. The magneto-resistive element 350 is usable in the magnetic head 200 shown in FIG. 3.

The magneto-resistive element 350 includes a magnetic substrate 201A, a soft magnetic layer with a high saturation magnetic flux density 212, a multi-layer film 403 acting as a part of a GMR element, hard bias layers 220, and electrodes 216.

The magnetic substrate 201A is formed of ferrite. The soft magnetic layer with a high saturation magnetic flux density 212 is provided on a surface of the magnetic substrate 201A. The multi-layer film 403 acting as a part of a GMR element is provided on a portion of a surface of the soft magnetic layer with a high saturation magnetic flux density 212. The hard bias layers 220 are provided so as to cover side surfaces of the multi-layer film 403. The hard bias layers 220 are respectively topped by the electrodes 216.

Figure 6:
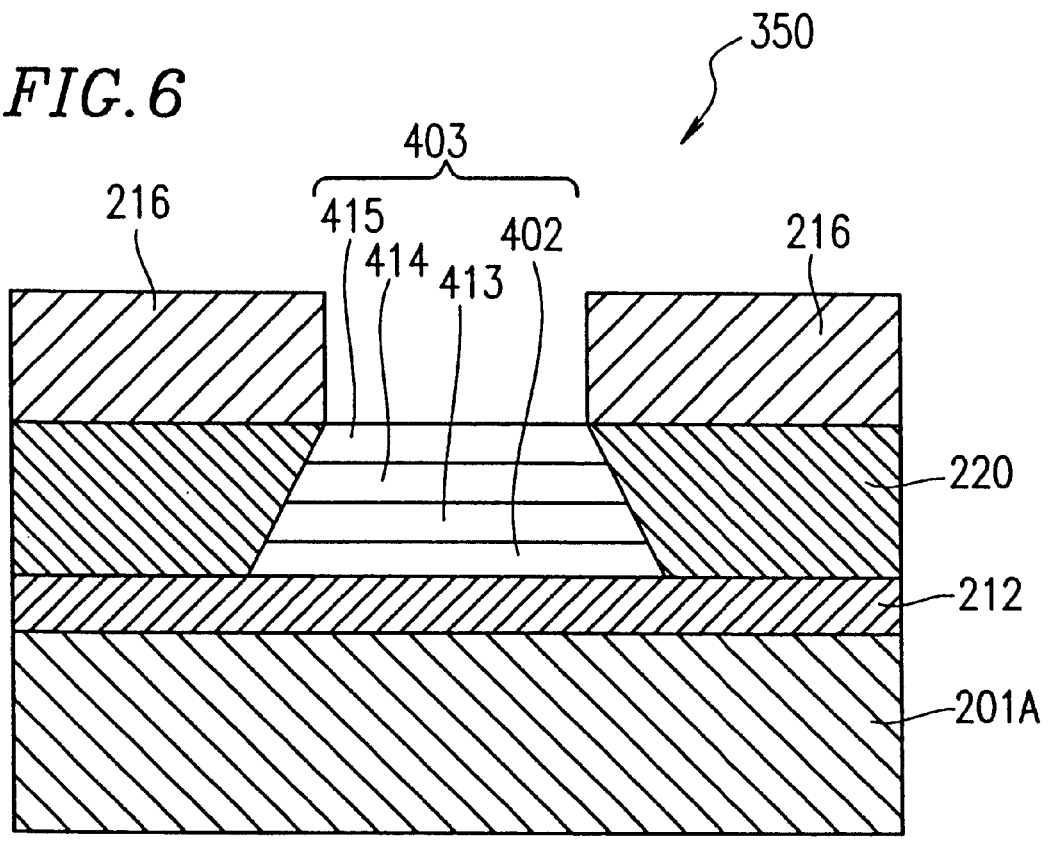
FIG. 6 is a cross-sectional view of the magneto-resistive element shown in FIG. 5.

FIG. 6 is a cross-sectional view of the magneto-resistive element 350 shown in FIG. 5 taken along plane A.

As shown in FIG. 6, the multi-layer film 403 includes a magnetic layer 402 acting as a free layer, a non-magnetic layer 413, a magnetic layer 414 acting as a fixed layer, and an anti-ferromagnetic layer 415 laminated in this order. The multi-layer film 403 is provided on the soft magnetic layer with a high saturation magnetic flux density 212. An exchange bias magnetic field is generated between magnetic layer 414 and the anti-ferromagnetic layer 415.

The magneto-resistive element 350 having the above-described structure operates, for example, as follows.

A current flowing from one of the electrodes 216 flows through the corresponding hard bias layer 220 and then flows parallel to surfaces of the layers of the multi-layer film 403. Then, the current flows through the other hard bias layer 220 and flows out to the other electrode 216. The multi-layer film 403 is a part of a GMR element, in which a current flows parallel to the surfaces of the layers therein. The magnetic substrate 201A also acts as a portion of the yoke 111 of the magnetic head 200 shown in FIG. 3.

A synthetic anti-ferromagnetic layer (not shown) magnetically coupled with the anti-ferromagnetic layer 415 may be provided on the opposite side from the magnetic substrate 201A with respect to the magnetic layer 414.

The magnetic substrate 201A may contain at least one of an oxide and a single crystalline oxide. The magnetic layer 402 may contain magnetite, or may be formed of at least one element selected from the group consisting of O, N, P, C and B. The non-magnetic layer 413 may include a metal non-magnetic material. An insulating layer 221 may be provided as shown in FIG. 5, or between the soft magnetic layer with a high saturation magnetic flux density 212 and the hard bias layers 220.

EXAMPLE 4

Figure 7:
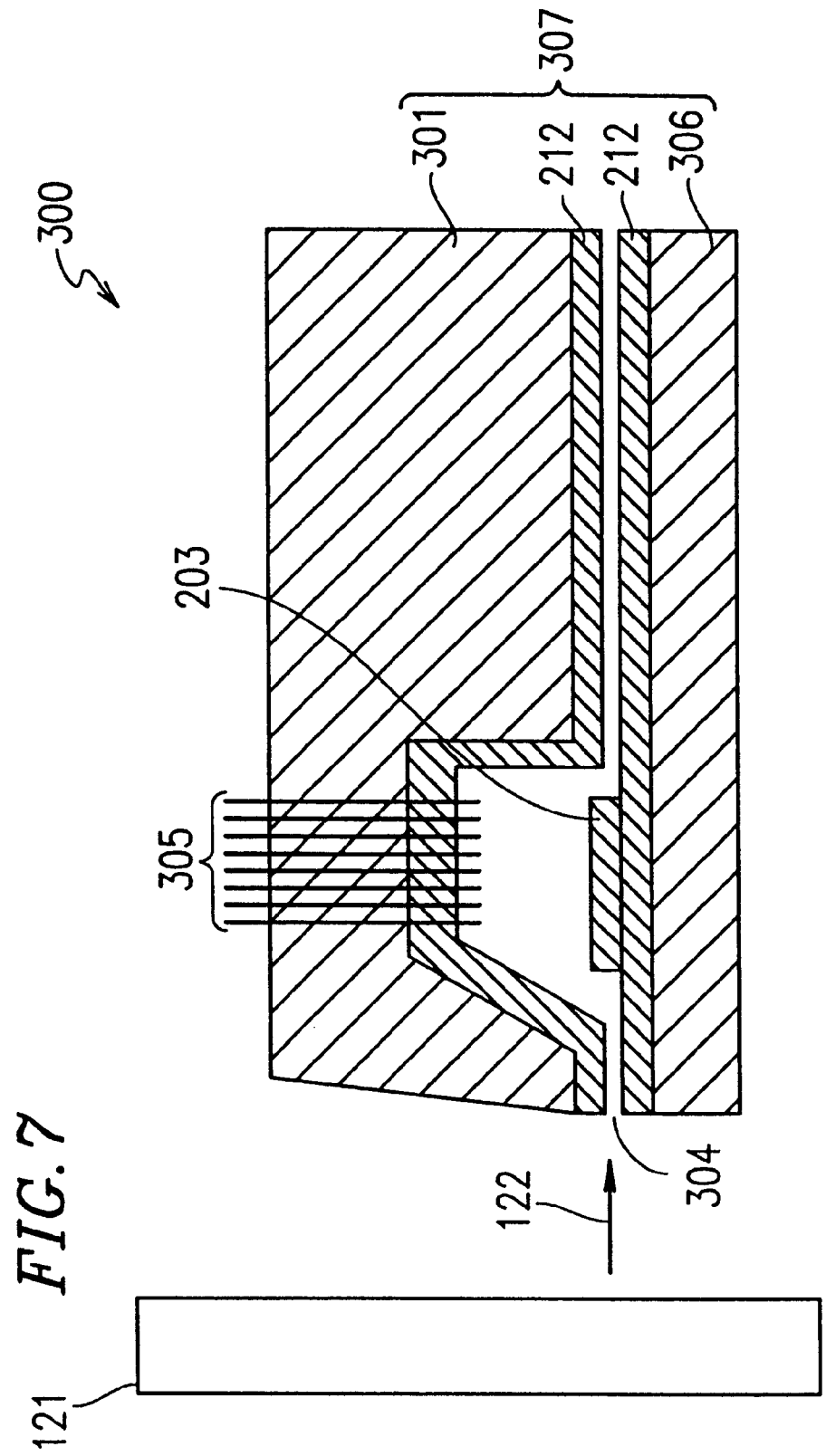
FIG. 7 shows a structure of a magnetic head according to still another example of the present invention.

FIG. 7 shows a structure of a magnetic head 300 according to a fourth example of the present invention. Identical elements previously discussed with respect to FIGS. 3 and 4 bear identical reference numerals and the detailed descriptions thereof will be omitted.

The magnetic head 300 includes a yoke 307. The yoke 307 includes two magnetic substrates 301 and 306. The magnetic substrate 301 is generally C-shaped with recess and is referred to also as a "C-shaped core". The magnetic substrate 306 is generally I-shaped and is referred to 5159 as an "I-shaped core". The I-shaped core is located so as to tare the recess of the C-shaped core 301. The magnetic substrates 301 and 306 are formed of ferrite.

The yoke 307 has a gap 304 formed of a non-magnetic material between the magnetic substrates 301 and 306 at one end thereof. The yoke 307 includes a soft magnetic layer with a high saturation magnetic flux density 212 provided on each of a surface of the I-shaped core 306 facing the C-shaped core 301 and on a surface of the C-shaped core 301 facing the I-shaped core 306.

The magnetic head 300 includes multi-layer film 203 on a portion of a surface of the soft magnetic layer with a high saturation magnetic flux density 212 which is provided on the I-shaped core 306, the portion facing the recess of the C-shaped core 301. An electromagnetic coil 305 is provided to surround a portion corresponding to the recess of the C-shaped core 301.

Figure 8:
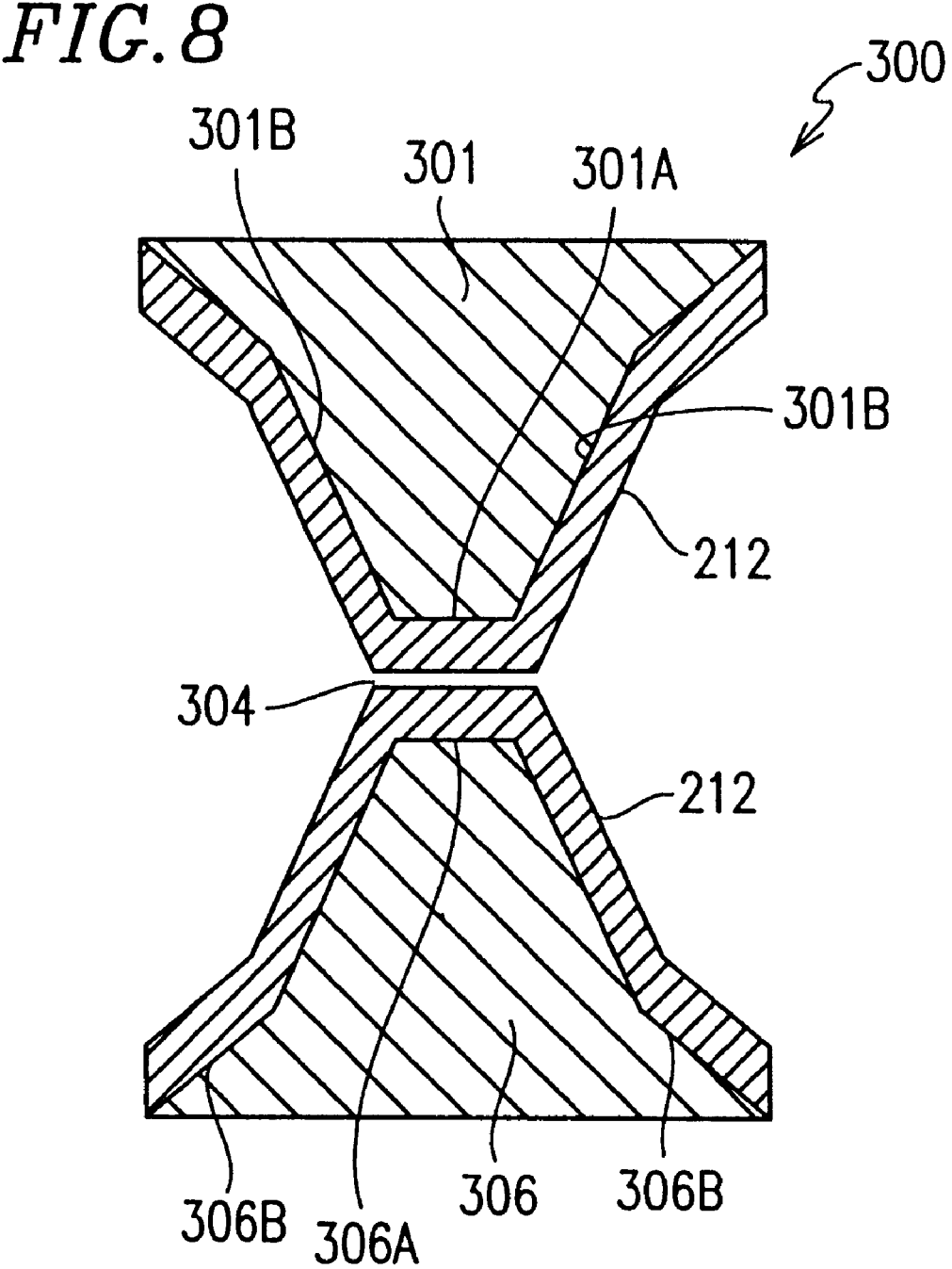
FIG. 8 show a structure of the magnetic head shown in FIG. 7 seen from a magnetic recording medium.

FIG. 8 is a view of the magnetic head 300 seen in the direction of arrow 122 in FIG. 7.

As shown in FIG. 8, the magnetic substrates 301 and 306 are both generally triangular in the vicinity of the gap 304 (more specifically, on the surfaces of the magnetic substrates 301 and 306 facing the magnetic recording medium 121 (FIG. 7). The C-shaped core 301 has a face 301A facing the gap 304 and side faces 301B extending from the face 301A. The I-shaped core 306 has a face 306A facing the gap 304 and side faces 306B extending from the face 306A. The soft magnetic layer with a high saturation magnetic flux density 212 is also formed on the faces 301A, 301B, 306A and 306B. In the examples in this specification and any other example of the present invention, the soft magnetic layers with a high saturation magnetic flux density 212 have a saturation magnetic flux density higher than that of the magnetic substrate 301 and 306.

EXAMPLE 5

Figure 9:
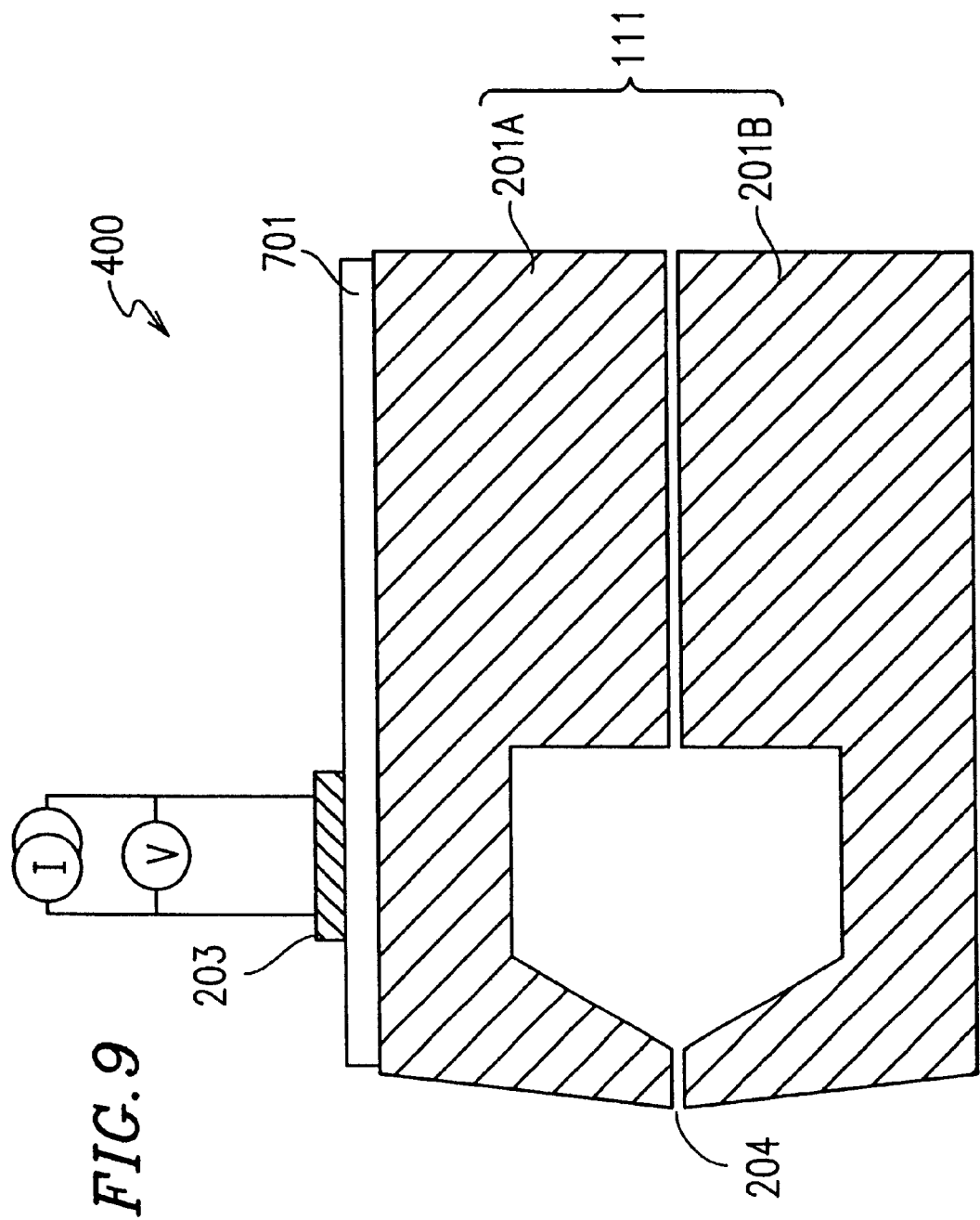
FIG. 9 shows a structure of a magnetic head according to still another example of the present invention.

FIG. 9 shows a structure of a magnetic head 400 according to a fifth example of the present invention. Identical elements previously discussed with respect to FIGS. 3 and 4 bear identical reference numerals and the detailed descriptions thereof will be omitted.

The magnetic head 400 includes a yoke 111. The yoke 111 includes a pair of magnetic substrates 201A and 201B. The magnetic substrates 201A and 201B are generally C-shaped with a recess. The magnetic substrates 201A and 201B are located so that the recesses face each other.

The yoke 111 has a gap 204 formed of a non-magnetic material between the magnetic substrates 201A and 201B at one end thereof. The magnetic head 400 includes an insulating layer 701 provided on a surface of the magnetic substrate 201A opposite to the magnetic substrate 201B. The magnetic head 400 further includes a multi-layer film 203 provided on a portion of a surface of the insulating layer 701 opposite to the magnetic substrate 201A.

EXAMPLE 6

Figure 10:
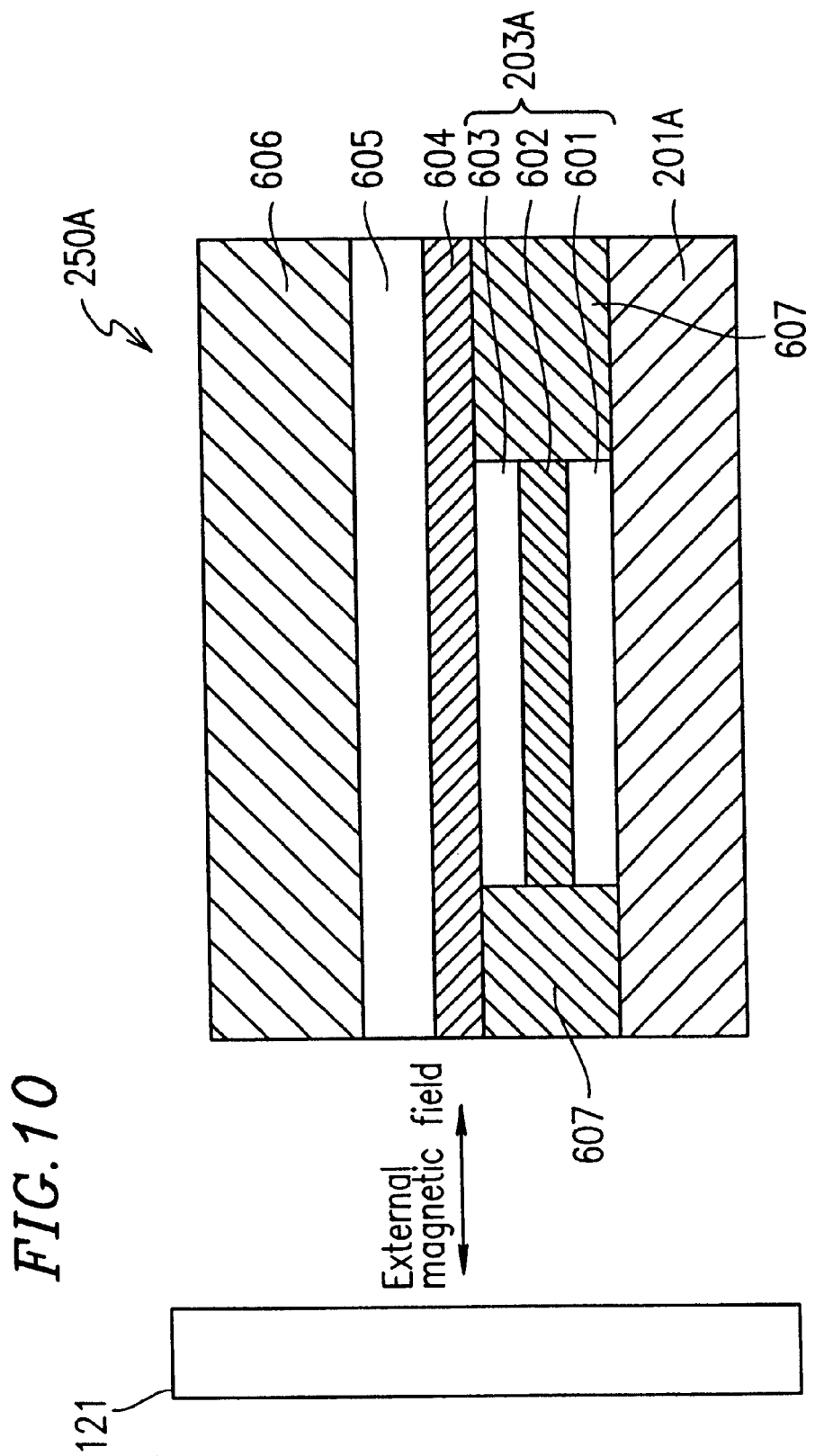
FIG. 10 is a cross-sectional view of a magneto-resistive element according to still another example of the present invention.

FIG. 10 is a cross-sectional view of a magneto-resistive element 250A according to a sixth example of the present invention. The magneto-resistive element 250A is usable in any magnetic head according to the present invention.

The magneto-resistive element 250A includes a magnetic substrate 201A and the following layers provided on the magnetic substrate 201A.

A first magnetic layer 601 is provided on a portion of a surface of the magnetic substrate 201A. On the first magnetic layer 601, a non-magnetic layer 602 and a second magnetic layer 603 are sequentially provided in this order. The second magnetic layer 603 includes a free layer in which magnetization rotation with respect to the external magnetic field is possible. The first magnetic layer 601 includes a fixed layer in which magnetization rotation is more difficult to occur than in the second magnetic layer 603. A multi-layer film 203A includes the first magnetic layer 601, the non-magnetic layer 602, and the second magnetic layer 603.

Portions of the surface of the magnetic substrate 201A are topped by inter-layer insulating layers 607, which are provided so as to cover side surfaces of the multi-layer film 203A. The magnetic resistance of the multi-layer film 203A changes in accordance a change in the external magnetic field. In this example, the magneto-resistive element 250A includes one multi-layer film 203A. Alternatively, the magneto-resistive element 250A may include a plurality of separate multi-layer films 203A provided in a direction normal to the paper of FIG. 10. In this case, a higher S/N ratio is provided since the multi-layer films 203A, which are substantially equidistant from an external magnetic field, can mutually cancel noise components generated therein.

Surfaces of the inter-layer insulating layers 607 and a surface of the multi-layer film 203A are covered with a flux guide 604. The flux guide 604 is formed of a soft magnetic having a magnetic permeability of 10 or higher, for example, NiFe, FeSiAl, or CoNiFe. The flux guide 604 preferably has a thickness of 1 $\mu$m or less so as to allow flux to go into the inside of the multi-layer film 203A in a depth or height direction (vertical to surfaces of the layers of the multi-layer film 203A).

A non-magnetic conductive layer 605 and an upper electrode 606 are sequentially provided on the flux guide 604 in this order. The upper electrode 606 is preferably formed of a magnetic material such as, for example, NiFe, and is produced by vapor deposition or plating. The upper electrode 606 and the magnetic substrate 201A acting as a lower electrode act to shield an undesirable external magnetic field (for example, an external magnetic field based on flux other than the flux generated by a recording bit of the magnetic recording medium 121 from which data is to be read). The non-magnetic conductive layer 605 provided between the flux guide 604 and the upper electrode 606 acts to completely separate the undesirable external magnetic field from a desirable external field guided by the flux guide 604 (for example, an external magnetic field based on the flux generated by a recording bit of the magnetic recording medium 121 from which data is to be read).

The magneto-resistive element 250A operates, for example, as follows.

An external magnetic field generated from the magnetic recording medium 121 passes through the flux guide 604 interposed between the interlayer insulating layers 607 and the non-magnetic layer 605, and reaches the second magnetic layer 603. Since the second magnetic layer 603 includes the free layer in which magnetization rotation with respect to the external magnetic field is possible, the magnetization direction of the second magnetic layer 603 changes in accordance with a change in the external magnetic field. The first magnetic layer 601 includes the fixed layer in which magnetization rotation with respect to the external magnetic field is more difficult to occur than in the second magnetic layer 603. Therefore, even when the external magnetic field is changed, the magnetization rotation of the first magnetic layer 601 does not change. Accordingly, the relative angle between the magnetization direction of the first magnetic layer 601 and the magnetization direction of the second magnetic layer 603 changes; and in accordance with the change in the relative angle, the magnetic resistance of the magneto-resistive element 203A changes.

When a current is caused to flow between the upper electrode 606 and the magnetic substrate 201A acting as a lower electrode in a direction vertical to the surfaces of the layers of the multi-layer film 203A, a change in the voltage which is in accordance with the change in the relative angle is detected. When a voltage is applied between the upper electrode 606 and the magnetic substrate 201A in a direction vertical to the surfaces of the layers of the multi-layer film 203A, a change in the current which is in accordance with the change in the relative angle is detected.

A non-magnetic conductive layer may be provided between the first magnetic layer 601 and the magnetic substrate 201A acting as a lower electrode. FIG. 10 shows only a reproduction element section. A recording element section using the upper electrode 606 as a part of a recording magnetic pole may be provided on the upper electrode 606.

Figure 11:
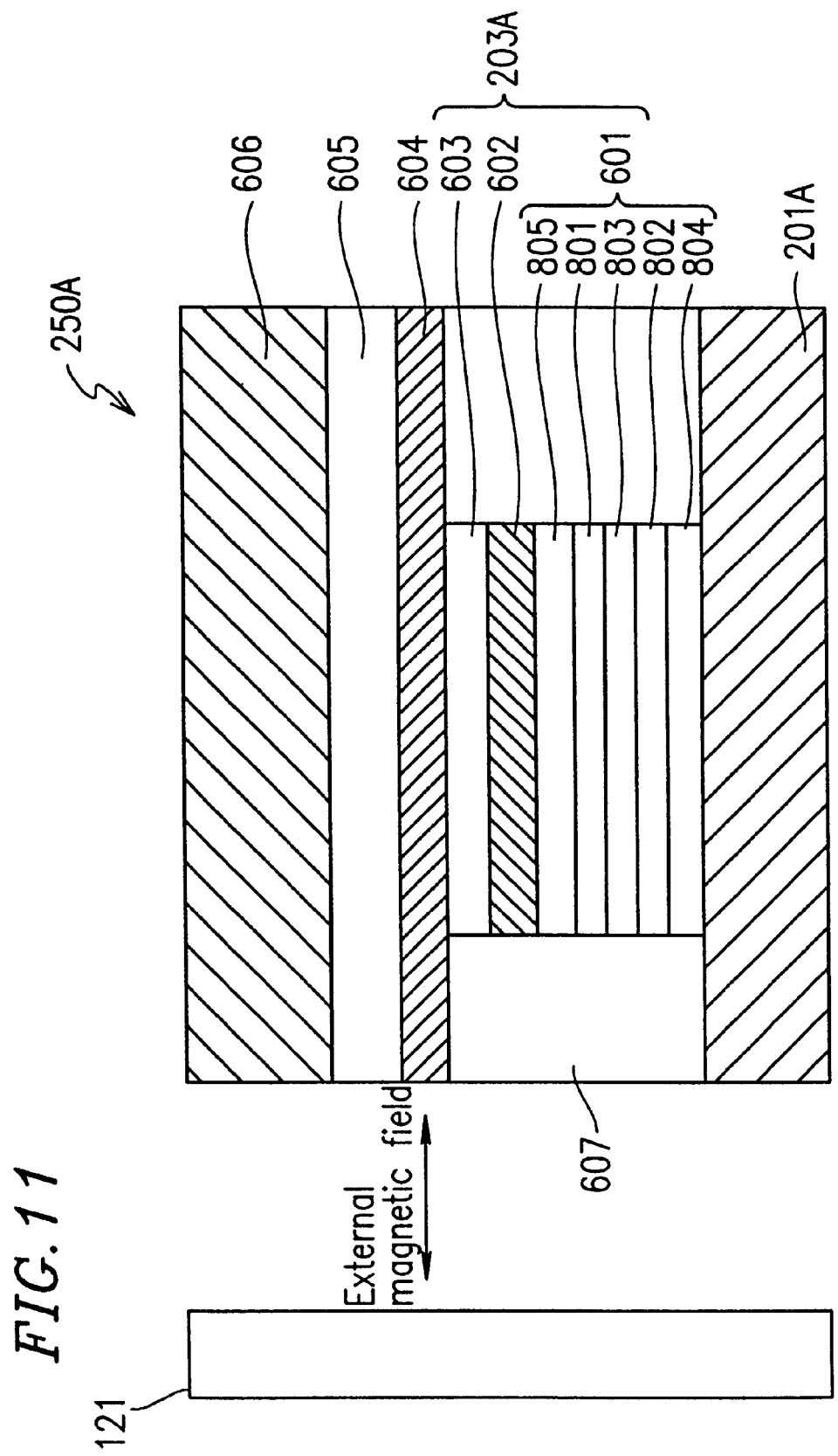
FIG. 11 is a cross-sectional view of a magneto-resistive element according to still another example of the present invention.

FIG. 11 is a detailed cross-sectional view of the magneto-resistive element 250A shown in FIG. 10. FIG. 11 shows a structure of the first magnetic layer 601 in detail.

As shown in FIG. 11, the first magnetic layer 601 includes a non-magnetic layer 804 provided on a portion of the surface of the magnetic substrate 201A. The first magnetic layer 601 also includes an anti-ferromagnetic layer 802, a magnetic layer for anti-ferromagnetic exchange coupling 803, a non-magnetic layer for anti-ferromagnetic exchange coupling 801, and a magnetic layer with a high spin polarization 805, which are sequentially provided on the non-magnetic layer 804 in this order. The non-magnetic layer 602 is provided on the magnetic layer with a high spin polarization 805.

The anti-ferromagnetic layer 802 is in contact with the magnetic substrate 201A (acting as a lower electrode) through the non-magnetic layer 804 (underlying layer) for the purpose of, for example, preventing the anti-ferromagnetic layer 802 from magnetically coupling with the magnetic substrate 201A and improving the crystallinity of the anti-ferromagnetic layer 802. The magnetic layer with a high spin polarization 805 is magnetically fixed by being anti-ferromagnetically coupled with the magnetic layer for anti-ferromagnetic exchange coupling 803, which is in contact with the anti-ferromagnetic layer 802, through the non-magnetic layer for anti-ferromagnetic exchange coupling 801.

The non-magnetic layer for anti-ferromagnetic exchange coupling 801 is formed of, for example, Ru, Ir, Cu, or Rh. When formed of Ru, the non-magnetic layer for anti-ferromagnetic exchange coupling 801 has a thickness of 0.6 nm or more and 0.9 nm or less. The anti-ferromagnetic layer 802 is formed of a material having a Néel temperature of 300 K or higher, for example, PtMn or IrM. The magnetic layer for anti-ferromagnetic exchange coupling 803 contains a metal magnetic element at 50% or higher which is selected from the group consisting of Fe, Co and Ni.

EXAMPLE 7

Figure 12:
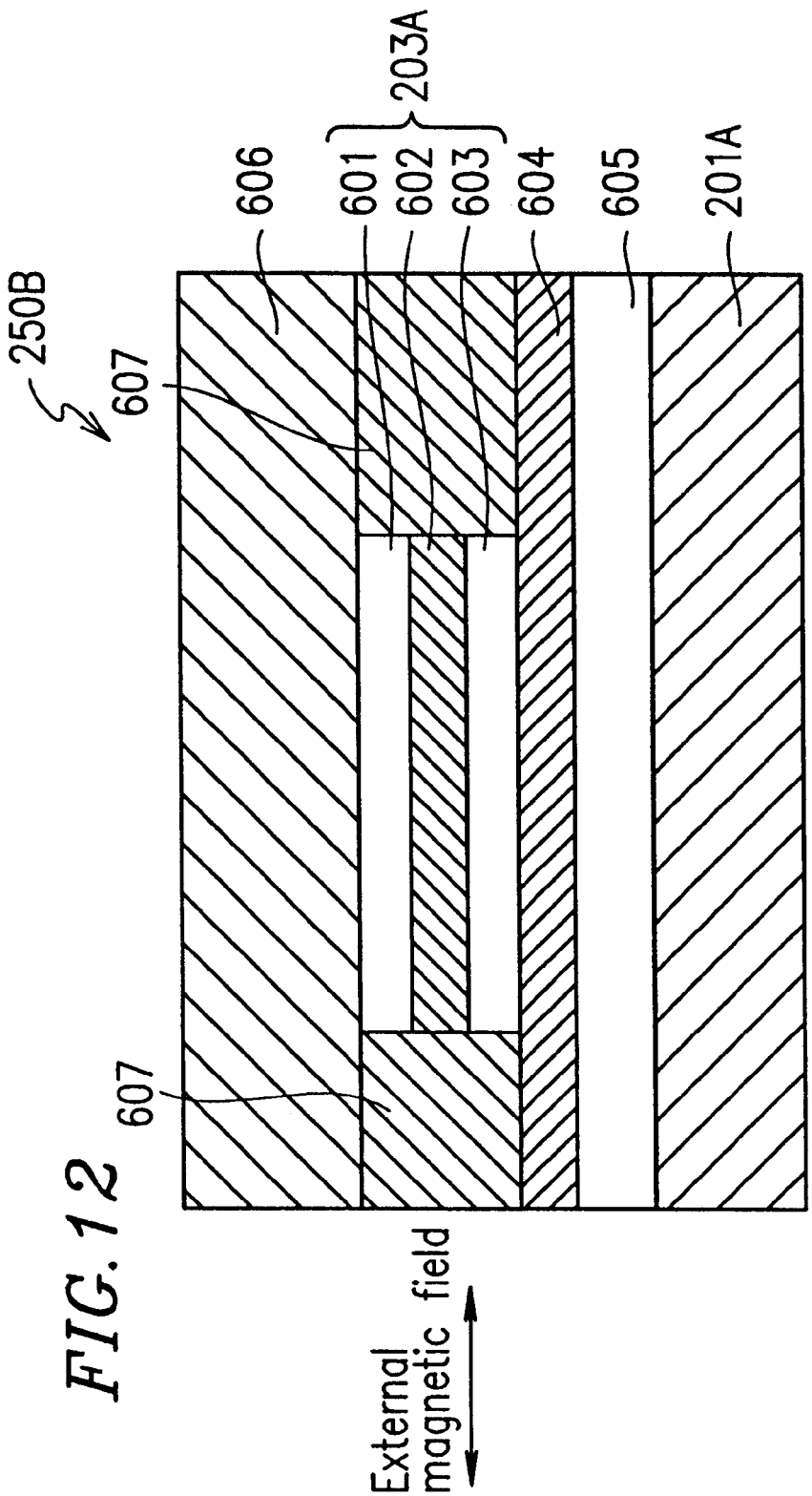
FIG. 12 is a cross-sectional view of a magneto-resistive element according to still another example of the present invention.

FIG. 12 is a cross-sectional view of a magneto-resistive element 250B according to a seventh example of the present invention. The magneto-resistive element 250B is usable in any magnetic head according to the present invention. Identical elements previously discussed with respect to FIG. 10 bear identical reference numerals and the detailed descriptions thereof will be omitted. The magneto-resistive element 250B includes a flux guide 604 provided on a surface of the multi-layer film 203A facing the magnetic substrate 201A.

A non-magnetic conductive layer 605 is provided on a surface of the magnetic substrate 201A. The flux guide 604 is provided so as to entirely cover a surface of the non-magnetic conductive layer 605. A second magnetic layer 603 is provided on a portion of a surface of the flux guide 604. On the second magnetic layer 603, a non-magnetic layer 602 and a first magnetic layer 601 are sequentially provided in this order. A multi-layer film 203A includes the first magnetic layer 601, the non-magnetic layer 602, and the second magnetic layer 603.

Portions of the surface of the flux guide 604 which are not covered with the multi-layer film 203A are topped by inter-layer insulating layers 607, which are provided so as to cover side surfaces of the multi-layer film 203A. Surfaces of the inter-layer insulating layers 607 and a surface of the first magnetic layer 601 are covered with an upper electrode 606.

EXAMPLE 8

Figure 13:
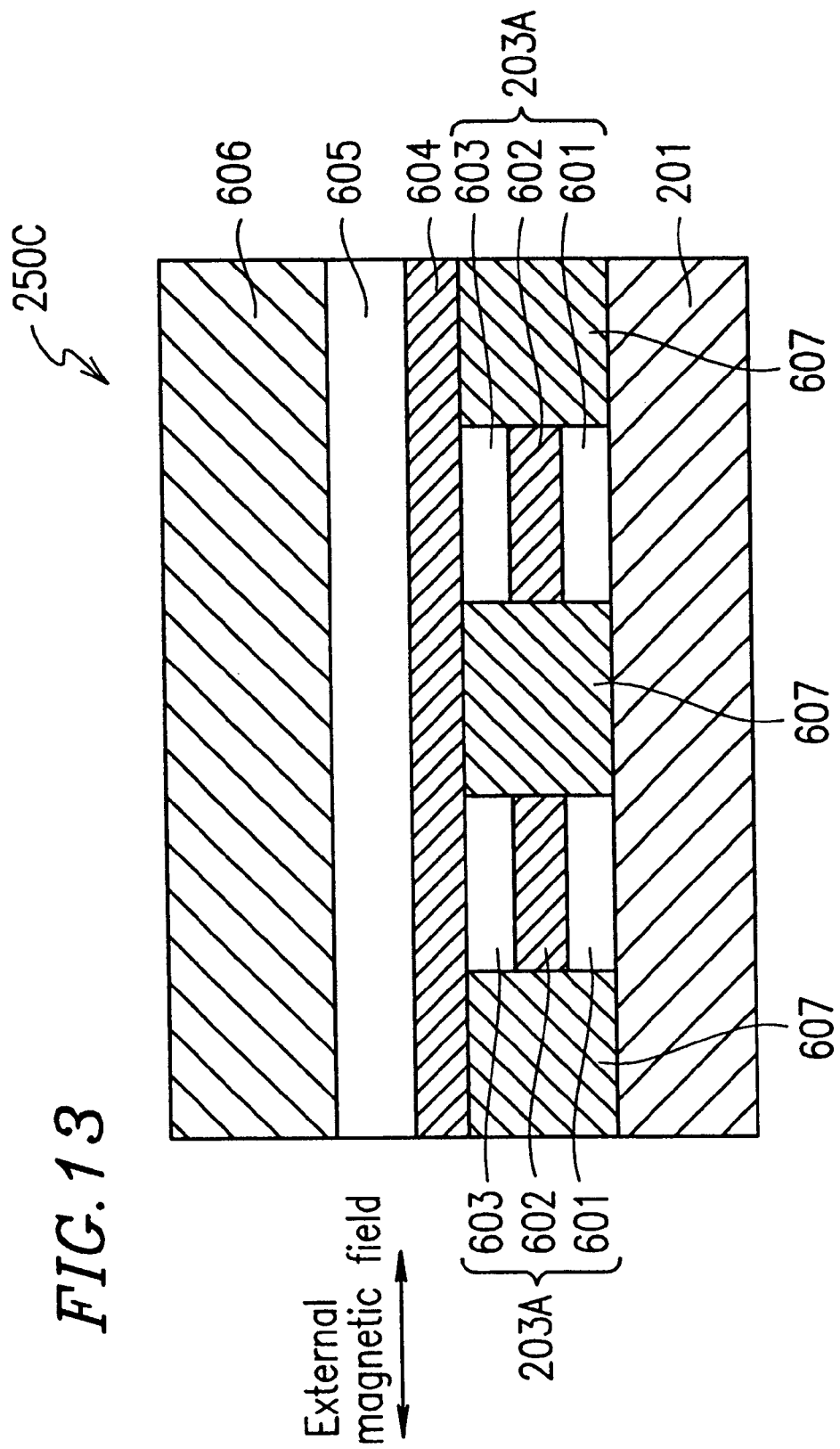
FIG. 13 is a cross-sectional view of a magneto-resistive element according to still another example of the present invention.

FIG. 13 is a cross-sectional view of a magneto-resistive element 250C according to an eighth example of the present invention. The magneto-resistive element 250C is usable in any magnetic head according to the present invention. Identical elements previously discussed with respect to FIG. 10 bear identical reference numerals and the detailed descriptions thereof will be omitted.

The magneto-resistive element 250C includes two multi-layer films 203A (including a first magnetic layer 601, a non-magnetic layer 602 and a second magnetic layer 603) provided along a longitudinal direction of the flux guide 604. The two multi-layer films 203A are substantially equidistant from the flux guide 604. In FIG. 13, two multi-layer films 203A are provided. Alternatively, three or more multi-layer films 203A may be provided along the longitudinal direction of the flux guide 604.

EXAMPLE 9

Figure 14:
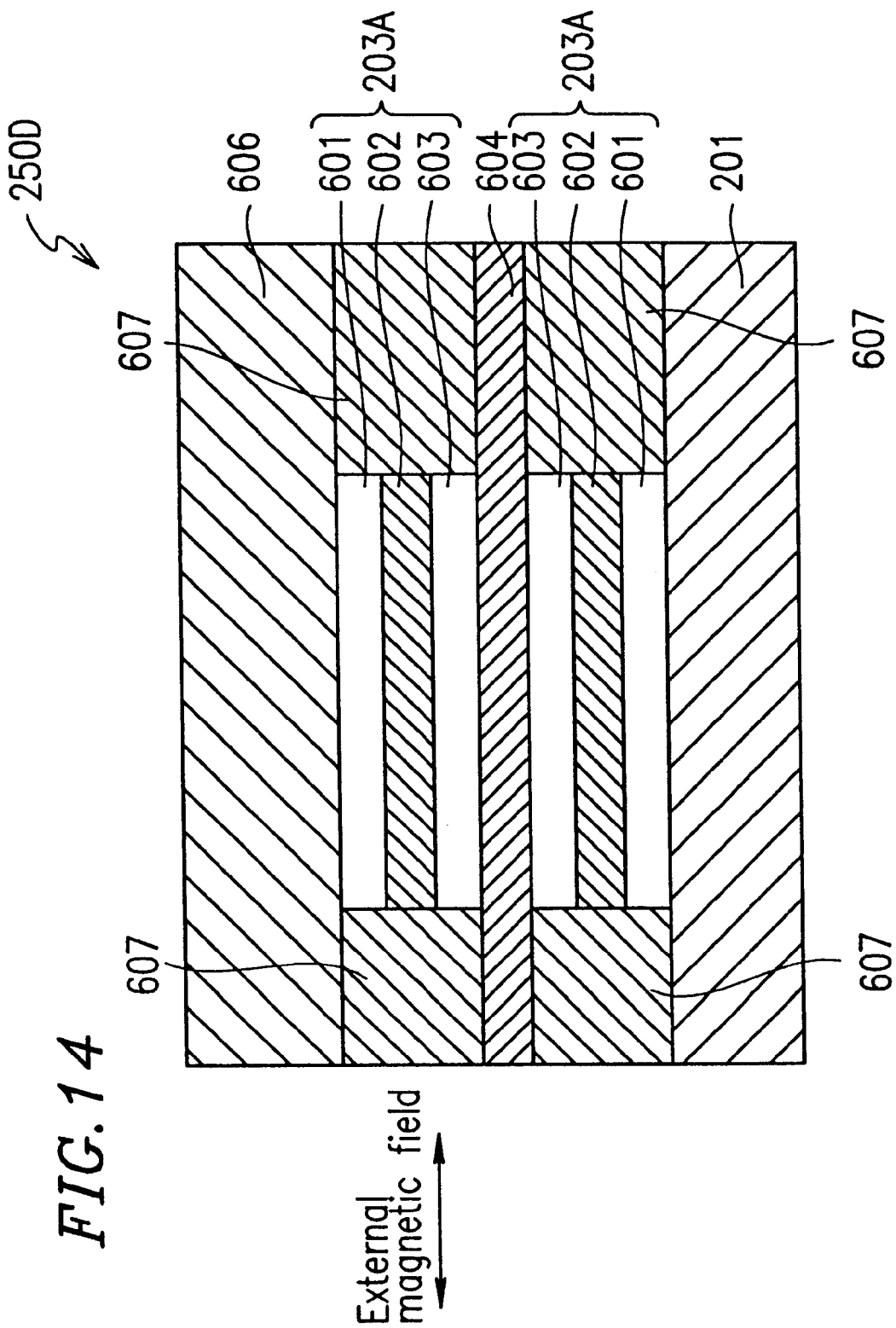
FIG. 14 is a cross-sectional view of a magneto-resistive element according to still another example of the present invention.

FIG. 14 is a cross-sectional view of a magneto-resistive element 250D according to a ninth example of the present invention. The magneto-resistive element 250D is usable in any magnetic head according to the present invention. Identical elements previously discussed with respect to FIG. 10 bear identical reference numerals and the detailed descriptions thereof will be omitted.

The magneto-resistive element 250D includes two multi-layer films 203A (including a first magnetic layer 601, a non-magnetic layer 602 and a second magnetic layer 603) provided along a direction vertical to the longitudinal direction of the flux guide 604. In FIG. 14, two multi-layer films 203A are provided. Alternatively, three or more multi-layer films 203A may be provided in a direction vertical to the longitudinal direction of the flux guide 604.

The anti-ferromagnetic layers, the magnetic layers and electrodes in the above examples can be easily produced by vacuum deposition, for example, IBD (ion beam deposition), sputtering, MBE or ion plating. In the case where the non-magnetic layer in the magneto-resistive element is formed of a compound, vacuum deposition is performed using the compound as a target. The compound used for the non-magnetic layer can be easily produced by a usual method, for example, by reactive vapor deposition, reactive sputtering, ion assisting, CVD, or leaving an element to react with a reactive gas atmosphere having an appropriate partial pressure at an appropriate temperature for a prescribed time period.

A magneto-resistive element according to the present invention can be produced by a physical or chemical etching method, for example, ion milling, RIE (reactive ion etching), EB (electron beam), or FIB (focused ion beam). When necessary, a film produced in a fine process is flattened by CMP or photolithography using a fine processing technique appropriate to a required line width. The produced film can be flattened by cluster ion beam etching performed in vacuum. This is effective for improving the MR ratio.

The magnetic substrates included in a magneto-resistive element according to the present invention can have surfaces thereof smoothed by a lapping technique, for example, MCL (mechanochemical lapping). The magnetic substrates can be shaped as desired by fine processing such as, for example, dicing sawing, laser processing or discharge processing. For forming a magnetic head, two magnetic substrates can be bonded together by bonding using low melting point glass or low melting point alloys.

EXAMPLE 10

Figure 15:
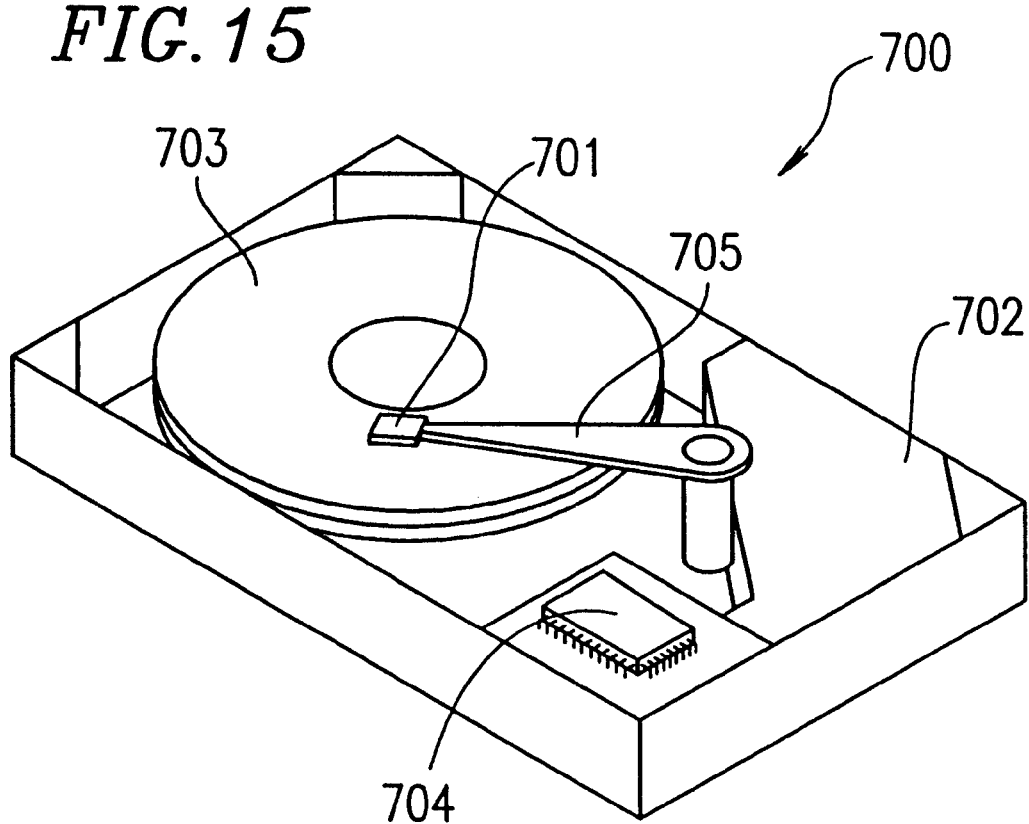
FIG. 15 is an isometric view of a magnetic recording and reproduction apparatus according to one example of the present invention.

FIG. 15 is an isometric view of a magnetic recording and reproduction apparatus 700 using a magnetic head having a magneto-resistive element according to the present invention. The magnetic recording and reproduction apparatus 700 is, for example, an HDD.

As shown in FIG. 15, the magnetic recording and reproduction apparatus 700 includes a magnetic head 701, an arm 705 for mounting the magnetic head 701, a driving section 702 for driving the arm 705, and a signal processing section 704 for processing a signal generated to represent data reproduced from a magnetic recording medium 703 by the magnetic head 701 and a signal which represents data to be recorded on the magnetic recording medium 703 by the magnetic head 701. The magnetic recording medium 703 is surface-treated with a DLC (diamond-like carbon) film.

The driving section 702 drives the arm 705 so as to locate the magnetic head 701 at a prescribed position above the magnetic recording medium 703. For reproduction, the magnetic head 701 reads data recorded on the magnetic recording medium 703. The signal processing section 704 performs processing for reproducing data read from the magnetic recording medium 705 by the magnetic head 701. For recording, the signal processing section 704 performs processing for recording data on the magnetic recording medium 703, and the magnetic head 701 records the data processed by the signal processing section 704 on the magnetic recording medium 703.

EXAMPLE 11

Figure 16:
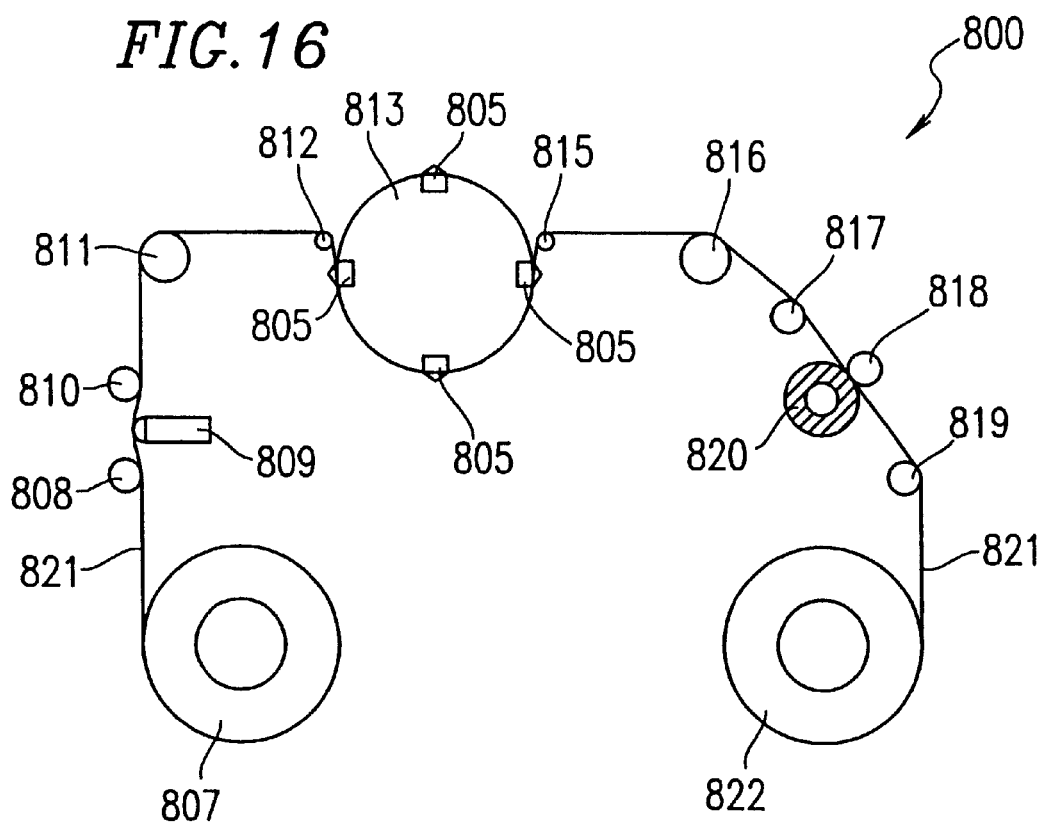
FIG. 16 is a schematic view of a magnetic recording and reproduction apparatus according to another example of the present invention.

FIG. 16 is a schematic view of another magnetic recording and reproduction apparatus 800 using a magnetic head having a magneto-resistive element according to the present invention. The magnetic recording and reproduction apparatus 800 is, for example, a VTR.

As shown in FIG. 16, the magnetic recording and reproduction apparatus 800 includes a rotatable drum 813, a supply reel 807, a winding reel 822, rotatable posts 808, 810, 811, 816, 817 and 819, inclining posts 812 and 815, a capstan 818, a pinch roller 820, and a tension arm 809 for supporting a tension post. A magnetic head 805 according to the present invention is provided on an external circumferential surface of the rotatable drum 813.

Figure 17:
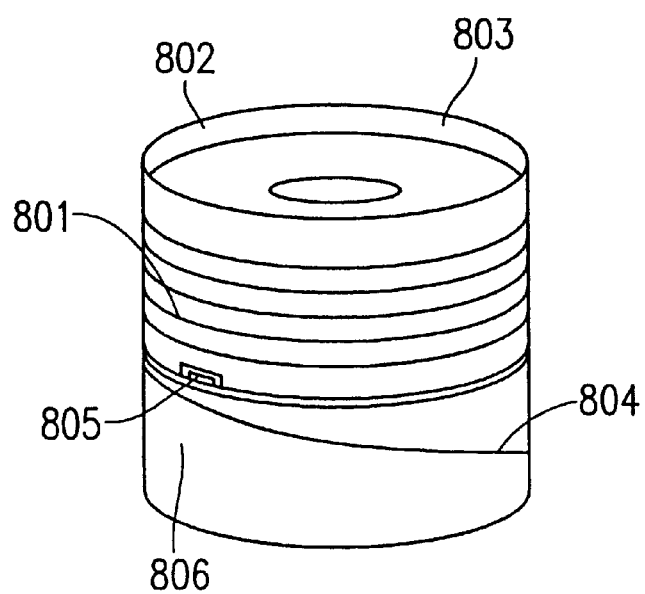
FIG. 17 is a perspective view of a rotatable drum in the information recording and reproduction apparatus shown in FIG. 16.

FIG. 17 is a perspective view of the rotatable drum 813. The rotatable drum 813 includes a lower drum 806 and an upper rotatable drum 802. The magnetic head 805 is provided on an external circumferential surface of the upper rotatable drum 802. A lead 804 is provided on an external circumferential surface of the lower drum 806. A magnetic tape (not shown in FIG. 17) runs along the lead 804, i.e., in an inclining state with respect to a rotation axis of the upper rotatable drum 802. The magnetic head 805 rotates in an inclining state with respect to the running direction of the magnetic tape. The external circumferential surface of the upper drum 802 has a plurality of grooves 801 formed therein, so that the magnetic tape runs stably in close contact with the upper rotatable drum 802. Air confined in the magnetic tape and the upper rotatable drum 802 is discharged from the grooves 801.

Referring back to FIG. 16, the magnetic tape (represented by reference numeral 821 in FIG. 16) which is wound around the supply reel 807 is driven by the capstan 818 and the pinch roller 820 in pressure contact with the capstan 818 and guided by the inclining posts 812 and 815. Thus, the magnetic tape 821 is pressed on the magnetic head 805 mounted on the rotatable drum 813. Then, the magnetic tape 821 passes through the pinch roller 820 and the capstan 818 and then wound around the winding reel 822. The rotatable drum 813 is of an upper rotatable drum system. The magnetic head 805 according to the present invention is provided so as to project from the external circumferential surface of the rotatable drum 813 by about 20 μm.

A magnetic recording and reproduction apparatus according to the present invention uses a yoke-type magnetic head. Therefore, the shape of the MR element, which is problematically changed in a helical scan system, is not changed. Also due to the yoke-type magnetic head, the undesirable possibility that, for example, the electrostatic destruction of the MR element is caused by the contacting and sliding movement, and the MR element is corroded by chemically reactive substances derived from the magnetic tape, the outside air or the like is very low. Therefore, the magnetic recording and reproduction apparatus can have a high reliability. In addition, a magnetic head according to the present invention uses a GMR element or TMR element and thus has superior characteristics (for example, MR ratio) to those of the conventional magnetic heads. Therefore, the magnetic head can provide a high recording density.

SPECIFIC EXAMPLES

SPECIFIC EXAMPLE 1

FIGS. 18A through 18F illustrate a process for producing the magnetic head 200 shown in FIG. 3 according to the present invention.

Figure 18C:
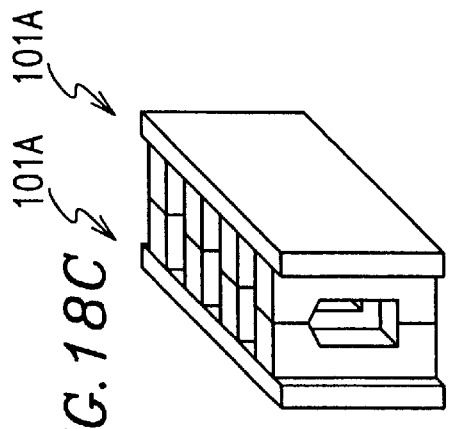
FIGS. 18A through 18F show a process for producing a magnetic head according to the present invention.
Figure 18F:
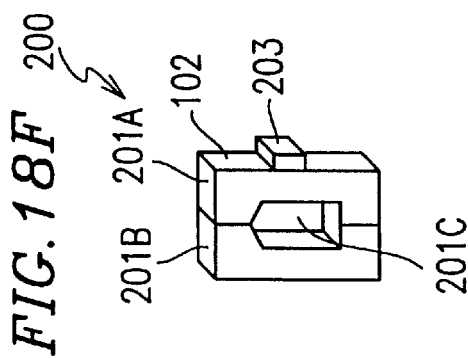
Figure 18B:
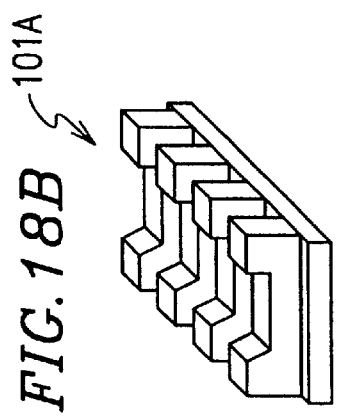
Figure 18E:
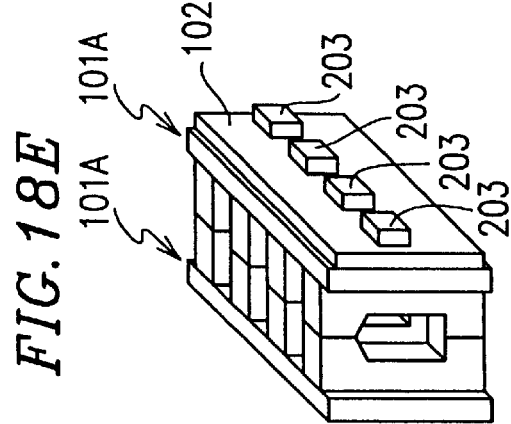
Figure 18A:
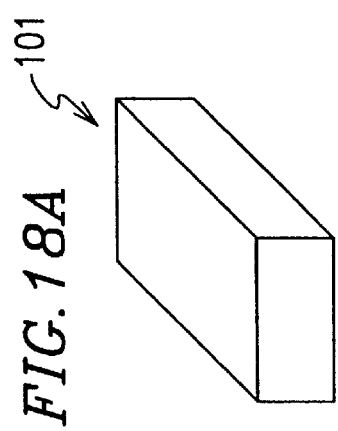

As shown in FIG. 18A, a ferrite substrate 101 was prepared. The ferrite substrate 101 was processed to form tracks, thereby forming a ferrite substrate 101A shown in FIG. 18B. A heat-resistant glass layer (e.g., Pyrex glass) and a Cr layer were formed so as to form a magnetic gap. Then, as shown in FIG. 18C, two ferrite substrates 101A were put together by glass bonding at 500° C.

Figure 18D:
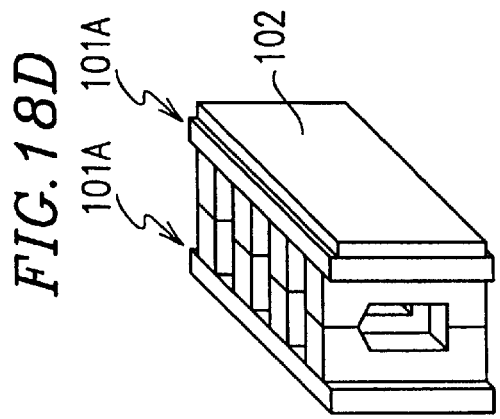

As shown in FIG. 18D, a magnetic layer 102 formed of magnetite ($Fe_3O_4$) was formed on a surface of one of the ferrite substrates 101A by RF magnetron sputtering to a thickness of 30 nm. The temperature of the ferrite substrates 101A was 300° C.

On the magnetic layer 102, an alumina layer was formed to a thickness of 1 nm. Then, on the alumina layer, a multi-layer film including layers of FeCo(3)/Ru(0.7)/FeCo(3)/PtMn(30)/Ta(5) were formed. In this specification, the numerical figures in the parentheses represent the thicknesses of the respective layers in units of nanometers. The multi-layer film was milled to form mesa-shaped portions by photolithography, so as to leave the magnetic layer 102 to have a thickness of 20 nm. Interlayer insulating layers of alumina were formed. A resist layer provided on the Ta layer was lifted-off, and portions of the Ta layer exposed by the lifting-off of the resist layer were removed by milling. Thus, the multi-layer films 203 (included in a TMR element) shown in FIG. 18E were formed. Then, an upper electrode including layers of Ta(3)/Cu(500)/Pt(5) was formed.

PtMn was magnetized in a magnetic field having a magnetic force of 5 k Oe along the magnetic path direction of the yoke in vacuum at 280° C. Then, the combined ferrite substrates 201A with the multi-layer films 203 were cut into chips using a dicing saw. Thus, as shown in FIG. 18F, the magnetic head 200 (FIG. 3) including a yoke having two magnetic substrates 201A and 201B and also including the magnetic layer 102 having a thickness of 20 nm was produced.

Another magnetic head (not shown; referred to by 200A for the sake of convenience) including a yoke having ferrite substrates 201A and 201B was produced by a similar process. For producing the magnetic head 200A, however, the magnetic layer 102 was not formed, and an alumina layer having a thickness of 1 nm was directly formed on one of the two ferrite substrates. In both the magnetic head 200 and 200A, the ferrite substrate 201A acts as an electrode.

As a comparative example, a conventional magnetic head having a structure similar to that of the magnetic heads 200 and 200A except having no multi-layer film was produced.

The magnetic heads 200 and 200A and the conventional magnetic head were each wound around by 10 turns of wire passing through a yoke window (201C in FIG. 18F in the case of the magnetic head 200), and tested for reproduction characteristics of a magnetic head coated with a DLC film. All the magnetic heads had a magnetic gap of 200 nm.

In a frequency range of 20 MHz to 40 MHz of a reproduction signal, the bit error rate was measured. The conventional magnetic head had a bit error rate of $10^{-5}$. The magnetic heads 200 and 200A according to the present invention each had a bit error rate of $10^{-7}$, which is smaller than that of the conventional magnetic head by 2 orders of magnitude. The magnetic heads 200 and 200A both exhibited superior anti-abrasion characteristics to that of the conventional magnetic head. A surface of each of magnetic heads 200 and 200A facing the magnetic tape may be coated with a DLC film.

SPECIFIC EXAMPLE 2

The magnetic head 300 shown in FIG. 7 including the yoke 307 which includes the C-shaped core 301 and the I-shaped core 306 was produced. The magnetic head 300 includes the multi-layer film 203 which is a part of a TMR element.

An alumina layer to act as a reaction prevention layer (underlying layer) was formed to a thickness of 2 nm on a surface of the C-shaped core 301 facing the I-shaped core and a surface of the I-shaped core 306 facing the C-shaped core. In a magnetic field having a magnetic force of 100 Oe in a direction vertical to the magnetic path, i.e., in a direction normal to the paper of FIG. 7, the soft magnetic layer with a high saturation magnetic flux density 212 of FeTaN (1.9 T) was formed to a thickness of 5 μm on each of the alumina layers.

On the soft magnetic layer with a high saturation magnetic flux density 212 provided on the I-shaped core 306 with the alumina layer interposed therebetween, a multi-layer film 203 was formed as follows. First, layers of CoFe(3)/Al(0.4) were formed on the soft magnetic layer with a high saturation magnetic flux density 212. The resultant laminate was oxidized for 1 minute at 200 Torr in an oxygen atmosphere. Next, an Al(0.3) layer was formed and then oxidized for 1 minute at 200 Torr in an oxygen atmosphere. Then, on the/Al(0.3) layer, layers of CoFe(3)/Ru(0.7)/CoFe(3)/PtMn(30)/Ta(3)/Pt(20) were formed. PtMn was magnetized in the magnetic path direction, and the multi-layer film was processed by milling to have a mesa shape, so as to leave the soft magnetic layer with a high saturation magnetic flux density 212 (FeTaN).

The I-shaped core 306 and the C-shaped core 301 were put together by metal bonding. The electromagnetic coil 305 was provided around the C-shaped core 301. Thus, the magnetic head 300 shown in FIG. 7 was produced. As described above, the magnetic head 300 includes the yoke 307 having the two magnetic substrates 301 and 306 and also including the soft magnetic layer with a high saturation magnetic flux density 212 (FeTaN).

As described above with reference to FIG. 8, the C-shaped core 301 and the I-shaped core 306 both have a triangular shape on the surfaces thereof facing the magnetic recording medium 121 (FIG. 7). The soft magnetic layer with a high saturation magnetic flux density 212 is also provided on the faces 301A, 301B, 306A and 306B defining the triangular shape of the C-shaped core 301 and the I-shaped core 306.

As a comparative example, a conventional MIG head having a structure similar to that of the magnetic head 300 and using FeTaN for the soft magnetic layer with a high saturation magnetic flux density 212 was produced.

The magnetic head 300 and the conventional magnetic head were tested for reproduction characteristics of a magnetic head coated with a DLC film. Both magnetic heads had a magnetic gap of 200 nm.

In a frequency range of 20 MHz to 40 MHz of a reproduction signal, the bit error rate was measured. The conventional magnetic head had a bit error rate of $10^{-5.5}$. The magnetic head 300 according to the present invention had a bit error rate of $10^{-8}$, which is smaller than that of the conventional magnetic head. The magnetic head 300 exhibited superior anti-abrasion characteristics to that of the conventional magnetic head. A surface of the magnetic head 300 facing the magnetic tape may be coated with a DLC film.

SPECIFIC EXAMPLE 3

The magnetic head 300 as shown in FIG. 7 including the yoke 307 which includes the C-shaped core 301 and the I-shaped core 306 was produced. The magnetic head 300 includes the multi-layer film 203, as shown in FIG. 4, which is a part of a TMR element.

An alumina layer to act as a reaction prevention layer (underlying layer) was formed to a thickness of 2 nm on a surface of the C-shaped core 301 facing the I-shaped core 306. In a magnetic field having a magnetic force of 100 Oe in a direction vertical to the magnetic path, i.e., in a direction normal to the paper of FIG. 7, the soft magnetic layer with a high saturation magnetic flux density 212 of FeAlN (2.0 T) was formed to a thickness of 5 $\mu$m on the alumina layer at a substrate temperature of 200° C.

Another alumina layer to act as a reaction prevention layer (underlying layer) was formed to a thickness of 2 nm on a surface of the I-shaped core 306 facing the C-shaped core 301. In a magnetic field having a magnetic force of 100 Oe in a direction vertical to the magnetic path, i.e., in a direction normal to the paper of FIG. 7, the soft magnetic layer with a high saturation magnetic flux density 212 of FeAlN (2.0 T) was formed to a thickness of 5 $\mu$m on the alumina layer at a substrate temperature of 200° C. A hard bias layer of CoPtCr was formed by patterning using EB exposure and lifting-off. Then, a multi-layer film 203 was formed as follows. First, layers of CoFe(3)/Al(0.4) were formed. The resultant laminate was oxidized for 1 minute at 200 Torr in an oxygen atmosphere. Next, an Al(0.3) layer was formed and then oxidized for 1 minute at 200 Torr in an oxygen atmosphere. Then, on the Al(0.3) layer, layers of CoFe(3)/Ru(0.7)/CoFe(3)/PtMn(30)/Ta(3)/Pt(20) were formed. PtMn was magnetized to the I-shaped core 306 in the magnetic path direction at 280° C. at 5 k Oe. Then, the direction of the magnetic field was changed at 90 degrees, and CoPtCr was magnetized in a magnetic field of 200 Oe at 200° C. Thus, orthogonalization annealing was performed.

Then, the multi-layer film was processed by milling to have a mesa shape, so as to leave the soft magnetic layer with a high saturation magnetic flux density 212 (FeAlN). As a result, the magneto-resistive element (TMR element) as shown in FIG. 4 was produced.

In FIG. 4, a direction normal to the paper is the magnetic path direction. PtMn is anisotropic in the direction normal to the paper. CoPtCr is anisotropic in the direction parallel to the longitudinal direction of the magnetic substrate 201A.

The I-shaped core 306 and the C-shaped core 301 were put together by metal bonding. The electromagnetic coil 305 was provided around the C-shaped core 301. Thus, the magnetic head 300 shown in FIG. 7 was produced.

As a comparative example, a conventional MIG head having a structure similar to that of the magnetic head 300 except for having no multi-layer film was produced.

The magnetic head 300 and the conventional magnetic head were tested for reproduction characteristics of a magnetic head coated with a DLC film. Both magnetic heads had a magnetic gap of 200 nm.

In a frequency range of 20 MHz to 40 MHz of a reproduction signal, the bit error rate was measured. The conventional magnetic head had a bit error rate of $10^{-5.5}$. The magnetic head 300 according to the present invention had a bit error rate of $10^{-8.5}$, which is smaller than that of the conventional magnetic head. The magnetic head 300 exhibited superior anti-abrasion characteristics to that of the conventional magnetic head. A surface of the magnetic head 300 facing the magnetic tape may be coated with a DLC film.

In specific examples 2 and 3, the magnetic layer (soft magnetic layer with a high saturation magnetic flux density 212) is formed of a nitride magnetic material (FeTaN, FeAlN). In specific example 1, the magnetic layer is formed of magnetite, which is an oxide magnetic material. Alternatively, the magnetic layer may be formed of, for example, a carbide magnetic material such as, for example, FeTaC, FeHfC, or FeHfPtC; a boride magnetic material such as, for example, FeSiB; or a phosphide. In such a case, a magnetic head, which was resistant to magnetic deterioration caused by a reaction between the substrate and the magnetic layer during heat treatment, was produced.

In the above-described specific examples, the reaction prevention layer (underlying layer) is formed of an alumina layer having a thickness of 2 nm. Alternatively, the underlying layer may be formed of a non-magnetic layer, an anti-ferromagnetic layer, or a hard magnetic layer with a large coercive force having a thickness of 0.5 nm or more and 50 nm or less.

In the above examples, the anti-ferromagnetic layer is provided in lower side portions of the magnetic layer. Alternatively, the anti-ferromagnetic layer may be provided on substantially the entire bottom surface of the magnetic layer. In such a structure, a bit error rate as low as that of the magnetic heads in the examples was provided.

In the structure where the soft magnetic layer with a high saturation magnetic flux density 212 was provided below the magnetic layer 102, when the soft magnetic layer with a high saturation magnetic flux density 212 had a thickness of 0.5 to 2 nm, the magnetic layer 102 obtained a single magnetic domain by anti-ferromagnetic coupling caused between the magnetic substrate 201A and the magnetic layer 102. When the soft magnetic layer with a high saturation magnetic flux density 212 had a thickness of 2 nm to 50 nm, the magnetic layer 102 obtained a single magnetic domain by static magnetic coupling caused between the magnetic substrate 201A and the magnetic layer 102. A magnetic head including a magneto-resistive element using such a soft magnetic layer with a high saturation magnetic flux density 212 provided a bit error rate superior to that of the conventional MIG head.

In specific example 3, the non-magnetic (tunneling) layer 213 is formed of alumina. Alternatively, the non-magnetic (tunneling) layer 213 may be formed of an oxide, a nitride, a carbide, a boride or a semiconductor. In such cases, satisfactory magnetic heads were obtained.

In specific example 3, the magnetic substrate 201A is formed of ferrite using a spinel-type oxide. Alternatively, the magnetic substrate 201A may be formed of a garnet-type oxide. In this case, a magnetic head having satisfactory characteristics was obtained. Among various type of ferrite, MnZn ferrite was especially preferable.

SPECIFIC EXAMPLE 4

The magnetic head 300 as shown in FIG. 7 including the yoke 307 which includes the C-shaped core 301 and the I-shaped core 306 was produced. The magnetic head 300 includes the multi-layer film 403, as shown in FIGS. 5 and 6, which is a part of a GMR element.

An alumina layer to act as a reaction prevention layer (underlying layer) was formed to a thickness of 1.5 nm on a surface of the C-shaped core 301 facing the I-shaped core 306. In a magnetic field having a magnetic force of 100 Oe in a direction vertical to the magnetic path, i.e., in a direction normal to the paper of FIG. 7, the soft magnetic layer with a high saturation magnetic flux density 212 of FeAlN (1.6 T) was formed to a thickness of 5 μm on the alumina layer.

On a surface of the I-shaped core 306 facing the C-shaped core 301, the soft magnetic layer with a high saturation magnetic flux density 212 of FeAlN was formed. A top portion having a depth of about 5 nm of the soft magnetic layer with a high saturation magnetic flux density 212 was etched by ECR etching, thereby flattening a surface thereof. Then, a multi-layer film (included in a GMR element) including layers of NiFe(5)/CoFe(1)/Cu(3)CoFe(3)/Ru(0.8)/CoFe(3)/PtMn(20)/Ta(3) was formed by magnetron sputtering. Thereafter, the CoFe/PtMn layers were provided with anisotropy by performing annealing in a magnetic field having a magnetic force of 5 k Oe in the magnetic path direction at 280° C. for 5 hours. Then, the NiFe/CoFe layers were provided with anisotropy by application of a magnetic field having a magnetic force of 100 Oe in a direction vertical to the magnetic path at 200° C. for 1 hour. The multi-layer film (included in a GMR element) was processed to have a mesa shape as shown in FIG. 6 by photolithography and argon milling, so as to leave the soft magnetic layer with a high saturation magnetic flux density 212 (FeAlN).

Next, the hard bias layer 220 of CoPtCr was formed while applying a magnetic field of 300 Oe in a direction vertical to the magnetic path. Then, as the electrode 216, layers of Cr/Au were formed. In FIG. 6, a direction normal to the paper is the magnetic path direction. CoFe/PtMn are anisotropic in the direction normal to the paper. CoPtCr is anisotropic in the direction parallel to the longitudinal direction of the magnetic substrate 201A.

The I-shaped core 306 and the C-shaped core 301 were put together by metal bonding. The electromagnetic coil 305 was provided around the C-shaped core 301. Thus, the magnetic head 300 shown in FIG. 7 was produced.

As a comparative example, a conventional MIG head having a structure similar to that of the magnetic head 300 except for having no multi-layer film was produced.

The magnetic head 300 and the conventional magnetic head were tested for reproduction characteristics of a magnetic head coated with a DLC film. Both magnetic heads had a magnetic gap of 200 nm.

In a frequency range of 20 MHz to 40 MHz of a reproduction signal, the bit error rate was measured. The conventional magnetic head had a bit error rate of $10^{-6}$. The magnetic head 300 according to the present invention had a bit error rate of $10^{-8}$, which is smaller than that of the conventional magnetic head. The magnetic head 300 exhibited superior anti-abrasion characteristics to that of the conventional magnetic head. A surface of the magnetic head 300 facing the magnetic tape may be coated with a DLC film.

SPECIFIC EXAMPLE 5

The magnetic head 400 as shown in FIG. 9 including the yoke 111 which includes the magnetic substrate 201A and 201B was produced. The magnetic head 400 includes the multi-layer film 203 which is a part of a TMR element or a GMR element.

An insulating layer 701 of alumina was formed to a thickness of 20 nm on the magnetic substrate 201A using IBD in order to insulate the multi-layer film 203 from the magnetic substrate 201A. On the insulating layer 701, multi-layer film 203 was formed as follows. For forming a TMR element, layers of NiFe(6)/Co(1)/Al(0.4) were formed, and the resultant laminate was oxidized for 1 minute at 200 Torr in an oxygen atmosphere. A layer of Al(0.3) was formed, and then layers of CoFe(2.5)/PtMn(20)/Ta(3)/Pt(20) were formed. For producing a GMR element, a structure of NiFe(6)/CoFe(1)/Cu(2.5)/CoFe(2.5)/PtMn(20)/Ta(3) was used. Next, PtMn was provided with magnetic anisotropy at 260° C. at 5 k Oe. Then, orthogonal heat treatment was performed under the conditions for applying a magnetic force of 100 Oe in a direction vertical to the magnetic force applied to PtMn. The multi-layer film were patterned by, for example, photolithography and ion milling. As a result, the magnetic head 400 shown in FIG. 9 was produced. As described above, the magnetic head 400 includes the multi-layer film 203, which is a part of a TMR element or a GMR element. The TMR element causes an electric current to flow vertically to the surfaces of the layers thereof. The GMR element causes an electric current to flow parallel to the surfaces of the layers thereof.

As a comparative example, a conventional ferrite head having a structure similar to that of the magnetic head 400 except for having no multi-layer film was produced. The conventional ferrite head was wound around by 10 turns of wire passing through a yoke window.

The magnetic head 400 and the conventional magnetic head were tested for reproduction characteristics of a magnetic head coated with a DLC film. Both magnetic heads had a magnetic gap of 200 nm.

In a frequency range of 20 MHz to 40 MHz of a reproduction signal, the bit error rate was measured. The conventional magnetic head had a bit error rate of $10^{-5}$. The magnetic head 400 according to the present invention had a bit error rate of $10^{-7}$, which is smaller than that of the conventional magnetic head. The magnetic head 400 exhibited superior anti-abrasion characteristics to that of the conventional magnetic head. A surface of the magnetic head 300 facing the magnetic tape may be coated with a DLC film.

As described above, the present invention provides a magneto-resistive element, a magnetic head and a magnetic recording and reproduction apparatus having superb anti-abrasion characteristics and head characteristics by providing the magneto-resistive element on a magnetic substrate.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magnetic head comprising:

a magnetic substrate for operating as a first electrode, a multi-layer film formed on a portion of the surface of the magnetic substrate, an inter-layer insulating layer provided to cover side surfaces of the multi-layer film, a flux guide formed on surfaces of the multi-layer film and inter-layer insulating layer, a non-magnetic conductive layer formed on a surface of the flux guide, and a second electrode formed on a surface of the non-magnetic conductive layer, wherein said multi-layer film includes
  a first magnetic layer formed on a portion of the surface of the magnetic substrate and includes a fixed layer, and
  a second magnetic layer including a non-magnetic layer formed on a surface of the first magnetic layer and a free layer formed on a surface of the non-magnetic layer,
wherein an external magnetic field being produced by a magnetic recording medium from which data is to be read acts to change the magnetization direction of the free layer included in the second magnetic layer through the flux guide, thereby to change a relative angle of magnetization between the first magnetic layer and the second magnetic layer, and to detect the variation of the relative angle of magnetization as a variation of electric current by means of the magnetic substrate operating as a first electrode and the second electrode upon changing the relative angle between the first magnetic layer and the second magnetic layer; and
wherein at least a portion of the inter-layer insulating layer is positioned between the flux guide and the magnetic substrate.

2. The magnetic head according to claim 1, wherein at least two multi-layer films are provided.

3. The magnetic head according to claim 1, wherein amplitude permeability of the flux guide is more than 10.

4. The magnetic head according to claim 1, wherein the flux guide is formed with NiFe, FeSiAl or CoNiFe.

5. The magnetic head according to claim 1, wherein the first magnetic layer includes a non-magnetic layer formed on a portion of the surface of the magnetic substrate and an anti-ferromagnetic layer formed on a surface of the non-magnetic layer.

6. The magnetic head according to claim 5, wherein the first magnetic layer further comprises in this order, a magnetic layer for antiferromagnetic exchange coupling, a non-magnetic layer for antiferromagnetic exchange coupling, and a magnetic layer of high spin polarization material on a surface of the anti-ferromagnetic layer.

7. The magnetic head according to claim 2, wherein a plurality of the multi-layer films are provided in parallel toward a longitudinal direction of the flux guide.

8. The magnetic head according to claim 2, wherein a plurality of the multi-layer films are provided vertically toward a longitudinal direction of the flux guide so that the flux guide is positioned therebetween.

9. A magnetic head comprising:
  a magnetic substrate for operating as a first electrode,
  a multi-layer film formed on a portion of the surface of the magnetic substrate,
  an inter-layer insulating layer provided to cover side surfaces of the multi-layer film,
  a flux guide formed on surfaces of the multi-layer film and inter-layer insulating layer,
  a non-magnetic conductive layer formed on a surface of the flux guide, and
  a second electrode formed on a surface of the non-magnetic conductive layer,
wherein said multi-layer film includes
  a first magnetic layer formed on a portion of the surface of the magnetic substrate and includes a fixed layer, and
  a second magnetic layer including a non-magnetic layer formed on a surface of the first magnetic layer and a free layer formed on a surface of the non-magnetic layer,
wherein an external magnetic field being produced by a magnetic recording medium from which data is to be read acts to change the magnetization direction of the free layer included in the second magnetic layer through the flux guide, thereby to change a relative angle of magnetization between the first magnetic layer and the second magnetic layer, and to detect the variation of the relative angle of magnetization as a variation of electric current by means of the magnetic substrate operating as a first electrode and the second electrode upon changing the relative angle between the first magnetic layer and the second magnetic layer; and
wherein at least a portion of the inter-layer insulating layer is positioned between the flux guide and the magnetic substrate
wherein the first magnetic layer includes, in this order, a non-magnetic layer, an anti-ferromagnetic layer, a magnetic layer for anti-ferromagnetic exchange coupling, a non-magnetic layer for antiferromagnetic exchange coupling, and a magnetic layer of high spin polarization material, formed on a portion of the surface of the magnetic substrate.

10. The magnetic head according to claim 9, wherein at least two multi-layer films are provided.

11. The magnetic head according to claim 9, wherein amplitude permeability of the flux guide is more than 10.

12. The magnetic head according to claim 9, wherein the flux guide is formed with NiFe, FeSiAl or CoNiFe.

13. The magnetic head according to claim 10, wherein a plurality of the multi-layer films are provided in parallel toward a longitudinal direction of the flux guide.

14. The magnetic head according to claim 10, wherein a plurality of the multi-layer films are provided vertically toward a longitudinal direction of the flux guide so that the flux guide is positioned therebetween.

15. A magnetic head comprising:
  a magnetic substrate for operating as a first electrode,
  at least two multi-layer films formed on a portion of the surface of the magnetic substrate,
  an inter-layer insulating layer provided to cover side surfaces of the multi-layer films,
  a flux guide formed on surfaces of the multi-layer films and inter-layer insulating layer,
  a non-magnetic conductive layer formed on a surface of the flux guide, and
  a second electrode formed on a surface of the non-magnetic conductive layer,
wherein each said multi-layer film includes
  a first magnetic layer formed on a portion of the surface of the magnetic substrate and includes a fixed layer, and
  a second magnetic layer including a non-magnetic layer formed on a surface of the first magnetic layer and a free layer formed on a surface of the non-magnetic layer,
wherein an external magnetic field being produced by a magnetic recording medium from which data is to be read acts to change the magnetization direction of the free layer included in the second magnetic layer through the flux guide, thereby to change a relative angle of magnetization between the first magnetic layer and the second magnetic layer, and to detect the variation of the relative angle of magnetization as a variation of electric current by means of the magnetic substrate operating as a first electrode and the second electrode upon changing the relative angle between the first magnetic layer and the second magnetic layer; and wherein at least a portion of the inter-layer insulating layer is positioned between the flux guide and the magnetic substrate.

16. The magnetic head according to claim 15, wherein amplitude permeability of the flux guide is more than 10.

17. The magnetic head according to claim 15, wherein the flux guide is formed with NiFe, FeSiAl or CoNiFe.

18. The magnetic head according to claim 15, wherein a plurality of the multi-layer films are provided in parallel toward a longitudinal direction of the flux guide.

19. The magnetic head according to claim 15, wherein a plurality of the multi-layer films are provided vertically toward a longitudinal direction of the flux guide so that the flux guide is positioned therebetween.

20. The magnetic head according to claim 15, wherein the first magnetic layer includes, in this order, a non-magnetic layer, an anti-ferromagnetic layer, a magnetic layer for anti-ferromagnetic exchange coupling, a non-magnetic layer for antiferromagnetic exchange coupling, and a magnetic layer of high spin polarization material, formed on a portion of the surface of the magnetic substrate.

* * * * *